US011786890B2

(12) United States Patent
Uribe-Romo et al.

(10) Patent No.: US 11,786,890 B2
(45) Date of Patent: Oct. 17, 2023

(54) PHOTO-REDOX TITANIUM CONTAINING ORGANIC FRAMEWORKS AND METHODS OF MAKING AND USE THEREOF

(71) Applicants: UNIVERSITY OF CENTRAL FLORIDA RESEARCH FOUNDATION, INC., Orlando, FL (US); FLORIDA STATE UNIVERSITY, Tallahassee, FL (US)

(72) Inventors: Fernando Javier Uribe-Romo, Orlando, FL (US); Matthew W. Logan, Orlando, FL (US); Kenneth Hanson, Tallahassee, FL (US); Suliman Ayad, Tallahassee, FL (US)

(73) Assignees: FLORIDA STATE UNIVERSITY, Tallahassee, FL (US); UNIVERSITY OF FLORIDA RESEARCH FOUNDATION, INC., Orlando, FL (US)

( * ) Notice: Subject to any disclaimer, the term of this patent is extended or adjusted under 35 U.S.C. 154(b) by 728 days.

(21) Appl. No.: 16/603,039

(22) PCT Filed: Apr. 4, 2018

(86) PCT No.: PCT/US2018/026137
§ 371 (c)(1),
(2) Date: Oct. 4, 2019

(87) PCT Pub. No.: WO2018/187507
PCT Pub. Date: Oct. 11, 2018

(65) Prior Publication Data
US 2020/0188896 A1 Jun. 18, 2020

Related U.S. Application Data

(60) Provisional application No. 62/481,268, filed on Apr. 4, 2017.

(51) Int. Cl.
| | | |
|---|---|---|
| *B01J 31/00* | (2006.01) |
| *B01J 31/16* | (2006.01) |
| *B01D 53/86* | (2006.01) |
| *B01J 35/00* | (2006.01) |
| *B01J 35/10* | (2006.01) |
| *C07F 7/28* | (2006.01) |

(52) U.S. Cl.
CPC ...... *B01J 31/1691* (2013.01); *B01D 53/8671* (2013.01); *B01J 35/004* (2013.01); *B01J 35/1019* (2013.01); *B01J 35/1023* (2013.01); *B01J 35/1028* (2013.01); *B01J 35/1038* (2013.01); *B01J 35/1042* (2013.01); *B01J 35/1047* (2013.01); *C07F 7/28* (2013.01); *B01D 2255/705* (2013.01); *B01D 2255/802* (2013.01); *B01D 2257/504* (2013.01); *B01J 2231/625* (2013.01); *B01J 2531/46* (2013.01)

(58) Field of Classification Search
None
See application file for complete search history.

(56) References Cited

PUBLICATIONS

Yaghi, Omar M., "Reticular Chemistry-Construction, Properties, and Precision Reactions of Frameworks", J. Am. Chem. Soc., 2016, vol. 138, pp. 15507-15509.

(Continued)

*Primary Examiner* — Yun Qian
(74) *Attorney, Agent, or Firm* — Timothy H. Van Dyke; WOLTER, VAN DYKE, DAVIS, PLLC

(57) ABSTRACT

Disclosed herein are metal-organic frameworks and methods of making and use thereof.

10 Claims, 19 Drawing Sheets

(56) References Cited

PUBLICATIONS

Yuan, Shuai et al., "A single crystalline porphyrinic titanium metal-organic framework", Chem. Sci., 2015, vol. 6, pp. 3926-3930.
Zeng, Le et al., "Metal-Organic Frameworks: Versatile Materials for Heterogeneous Photocatalysis", ACS Catal., 2016, vol. 6, pp. 7935-7947.
Zhang, Lei et al., "Highly Efficient Ruthenium-Catalyzed N-Formylation of Amines with H2 and CO2", Angew. Chem. Int. Ed., 2015, vol. 54, pp. 6186-6189.
Zou, Lanfang et al., "A versatile synthetic route for the preparation of titanium metal-organic frameworks", Chem. Sci., 2016, vol. 7, pp. 1063-1069.
PCT/US2018/026137, PCT Search Report & Written Opinion, dated Aug. 13, 2018, 15 pages.
Anslyn, Eric V. et al., "Modern Physical Organic Chemistry", Journal of Chemical Education, Mar. 3, 2006, vol. 83, No. 3, p. 387.
Asahi, R. et al., "Visible-Light Photocatalysis in Nitrogen-Doped Titanium Oxides", Science, Jul. 13, 2001, vol. 293, No. 5528, pp. 269-271.
Assi, Hala et al., "Investigating the Case of Titanium (IV) Carboxphenolate Photoactive Coordination Polymers", Inorg. Chem., 2016, vol. 55, pp. 7192-7199.
Bueken, Bart et al., "A Flexible Photoactive Titanium Metal-Organic Framework Based on a [TiIV 3(m3-O)(O)2(COO) 6] Cluster", Angew. Chem. Int. Ed., 2015, vol. 54, pp. 13912-13917.
Dan-Hardi, Meenakshi et al., "A New Photoactive Crystalline Highly Porous Titanium (IV) Dicarboxylate", J. Am. Chem. Soc., 2009, vol. 131, pp. 10857-10859.
De Miguel, Maykel et al., Evidence of Photoinduced Charge Separation in the Metal-Organic Framework MIL-125 (Ti)—MH2, ChemPhysChem, 2012, vol. 13, pp. 3651-3654.
Fu, Yanghe et al., "An Amine-Functionalized Titanium Metal-Organic Framework Photocatalyst with Visible-Light-Induced Activity for CO2", Angew. Chem. Int. Ed., 2012, vol. 51, pp. 3364-3367.
Furukawa, Hiroyasu et al., "Ultrahigh Porosity in Metal-Organic Frameworks", Science, Jul. 23, 2010, vol. 329, No. 5990, pp. 424-428.
Furukawa, Hroyasu et al., "The Chemistry and Applications of Metal-Organic Frameworks", Science, Aug. 30, 2013, vol. 341, vol. 4, No. 6149, 14 pages.
Gao, Junkuo et al., "A p-type Ti(IV)-based metal-organic framework with visible-light photo-response", Chem Commun., 2014, vol. 50, pp. 3786-3788.
Habisreutinger, Severin N. et al., "Photocatalytic Reduction of CO2 on TiO2 and Other Semiconductors", Angew. Chem. Int. Ed., 2013, vol. 52, pp. 7372-7408.
Hahm, Hyungwoo et al., "Synthesis of secondary and tertiary amine-containing MOFs: C—N bond cleavage during MOF synthesis", CrystEngComm, 2015, vol. 17, pp. 5644-5650.
Hatchard, C.G. et al., "A new sensitive chemical actinometer II. Potassium ferrioxalate as a standard chemical actinometer", Jan. 19, 1956, pp. 518-536.
He, Hongming et al., "Metal-Organic Frameworks for CO2 Chemical Transformations", Small ,2016, vol. 12, No. 46, pp. 6309-6324.
Hendon, Christopher H. et al., "Engineering the Optical Response of the Titanium-MIL-125 Metal-Organic Framework through Ligand Functionalization", J. Am. Chem. Soc., 2013, vol. 135, pp. 10942-10945.
Hishida, Hitoshi et al., "Electrochemical Reaction of CO2 with Me2NH to Afford N,N-Dimethyformamide, Catalyzed by [Ru (bpy)2CO2]2+(bpy=2,2'-bipyridine)", Chemistry Letters, 1987, pp. 597-600.
Kim, Se-Na et al., Adsorption/catalytic properties of MIL-125 and NH-MIL-125:, Catalysis Today, Apr. 15, 2013, vol. 204, pp. 85-93.
Kobayashi, Katsuaki et al., "Selective Generation of Formamides through Photocatalytic CO2 Reduction Catalyzed by Ruthenium Carbonyl Compounds", Angew Chem Int. Ed., 2014, vol. 53, pp. 11813-11817.

Kreno, Lauren E. et al., "Metal-Organic Framework Materials as Chemical Sensors", Chem. Rev., 2012, vol. 112, pp. 1105-1125.
Li, Jian-Rong et al., "Selective gas adsorption and separation in metal-organic frameworks", Chem. Soc. Rev., 2009, vol. 38, pp. 1477-1504.
Lin, Chi-Kai et al., "Tunability of Band Gaps in Metal-Organic Frameworks", Inorg. Chem., 2012, vol. 51, pp. 9039-9044.
Li, Ping et al;., "Hexahedron Prism-Anchored Octahedronal CeO2: Crystal Facet-Based Homojunction Promoting Efficient Solar Fuel Synthesis", J. Am. Chem. Soc., 2015, vol. 137, pp. 9547-9550.
Logan, Matthew W. et al., "Heterogeneous photoredox synthesis of N-hydroxy-oxazolidinones catalysed by metal-organic frameworks", Catal. Sci. Technol., 2016, vol. 6, pp. 5647-5655.
Murray, Leslie J. et al., "Hydrogen storage in metal-organic frameworks", Chem. Soc. Rev., 2009, vol. 38, pp. 1294-1314.
Nasalevich, Maxim A. et al., "Enhancing optical absorption of metal-organic frameworks for improved visible light photocatalysis", Chem. Commun., 2013, vol. 49, pp. 10575-10577.
Nguyen, Ha L. et al., "A Titanium-Organic Framework as an Exemplar of Combining the Chemistry of Metal- and Covalent-Organic Frameworks", J. Am. Chem. Soc., 2016, vol. 138, pp. 4330-4333.
Patil, Umakant B. et al., "Nanoceria-catalyzed Highly Efficient Procedure for N-Formylation of Amines at Room Temperature under Solvent-free Conditions", Chem. Lett., 2013, vol. 42, pp. 524-526.
Pellegrin, Yann et al., "Sacrificial electron donor reagents for solar fuel production", C. R. Chimie 20, 2017, pp. 283-295.
Pham, Hung Q. et al., "Engineering of Band Gap in Metal-Organic Frameworks by Functionalizing Organic Linker: A Systematic Density Functional Theory Investigation", J. Phys. Chem. C, 2014, vol. 118, pp. 4567-4577.
Pimputkar, Siddha et al., "Prospects for LED lighting", Nature Photonics |, Apr. 2009, vol. 3, pp. 180-182.
Quadrelli, Roberta et al,, "The energy-climate challenge: Recent trends in CO2 emissions from fuel combustion", Energy Policy 35, 2007, pp. 5938-5952.
Santaclara, Jara G. et al., "Organic Linker Defines the Excited-State Decay of Photocatalytic MIL-125(Ti)-Type Materials", ChemSusChem, 2016, vol. 9, pp. 388-395.
Schultz, Danielle M. et al., "Solar Synthesis: Prospects in Visible Light Photocatalysis", Science, Feb. 28, 2014, vol. 343, 1239176-1-1239176-8.
Serpone, Nick et al., "Terminology, Relative Photonic Efficiencies and Quantum Yields in Heterogeneous Photocatalysis. Part I: Suggested Protocol", Pure & Appl. Chem.,1999, vol. 71, No. 2, pp. 303-320.
Serre, Christian et al., "Synthesis, Structure and Properties of Related Microporous N,N" Piperazinebismethylenephosphonates of Aluminum and Titanium", Chem. Mater., 2006, vol. 18, pp. 1451-1457.
Shen, Lijuan et al., "A Clean and General Strategy To Decorate a Titanium Metal-Organic Framework with Noble-Metal Nanoparticles for Versatile Photocatalytic Applications", Inorg. Chem., 2015, vol. 54, pp. 1191-1193.
Sippel, Pit et al., "Dielectric Relaxation Processes, Electronic Structure, and Band Gap Engineering of MFU-4-type Metal-Organic Frameworks: Towards a Rational Design of Semiconducting Microporous Materials", Adv. Funct. Mater., 2014, vol. 24, pp. 3885-3896.
Sumida, Kenji et al., "Carbon Dioxide Capture in Metal-Organic Frameworks", Chem. Rev., 2012, vol. 112, pp. 724-781.
Sun, Chun-Yi et al., "Metal-organic frameworks as potential drug delivery systems", Expert Opin. Drug Deliv., 2013, vol. 10, No. 1, pp. 89-101.
Sun, Dengrong et al., "Visible-light-assisted aerobic photocatalytic oxidation of amines to imines over NH2-MIL-125 (Ti)", Applied Catalysis B: Environmental, 2015, vol. 164, pp. 428-432.
Tlili, Anis et al., "Reductive functionalization of CO2 with amines: an entry to formamide, formamidine and methylamine derivatives", Green Chem., 2015, vol. 17, pp. 157-168.

(56) References Cited

PUBLICATIONS

Toby, Brian H. et al., "GSAS-II: the genesis of a modem open-source all purpose crystallography software package", J. Appl. Cryst., 2013, vol. 46, pp. 544-549.

Toyao, Takashi et al., "Efficient hydrogen production and photocatalytic reduction of nitrobenzene over a visible-light-responsive metal-organic framework photocatalyst",Catal. Sci. Technol., 2013, vol. 3, pp. 2092-2097.

Tu, Wenguang et al., "Photocatalytic Conversion of CO 2 into Renewable Hydrocarbon Fuels: State-of-the-Art Accomplishment, Challenges, and Prospects", Adv. Mater. 2014, vol. 26, pp. 4607-4626.

Walton, Krista S. et al., "Applicability of the BET Method for Determining Surface Areas of Microporous Metal-Organic Frameworks", J. Am. Chem. Soc., 2007, vol. 129, pp. 8552-8556.

Wang, Cheng et al., "Metal-Organic Frameworks as A Tunable Platform for Designing Functional Molecular Materials", J. Am. Chem. Soc., 2013, vol. 135, pp. 13222-13234.

Wang, Congjun et al., "Visible Light Photoreduction of CO2 Using CdSe/Pt/TiO2 Heterostructured Catalysts", J. Phys. Chem. Lett., 2010, vol. 1, pp. 48-53.

Wang, Hou et al., "Facile synthesis of amino-functionalized titanium metal-organic frameworks and their superior visible-light photocatalytic activity for Cr(VI) reduction", Journal of Hazardous Materials, 2015, vol. 286, pp. 187-194.

Woolerton, Thomas W. et al., "Efficient and Clean Photoreduction of CO2 to CO by Enzyme-Modified TiO2 Nanoparticles Using Visible Light", J. Am. Chem. Soc., 2010, vol. 132, pp. 2132-2133.

Yaghi, Omar M. et al., "Reticular synthesis and the design of new materials", Nature, Jun. 12, 2003, vol. 423, pp. 705-714.

PHOTO-REDOX TITANIUM CONTAINING ORGANIC FRAMEWORKS AND METHODS OF MAKING AND USE THEREOF

STATEMENT OF GOVERNMENT SUPPORT

This invention was made with government support under Grant No. CHE-1531629 awarded by the National Science Foundation. The government has certain rights in the invention.

BACKGROUND

The accumulation of carbon dioxide in the atmosphere as a result of human activity is one of the largest contributing factors in the gradual warming of the Earth [1]. The Earth has a natural system of negative feedback processes to balance these accumulations, primarily by carbon fixation through photosynthesis. The amount of carbon dioxide already in the atmosphere is far too large for natural photosynthesis to reduce its accumulation in the short term. Therefore, it is urgent that technologies be developed that are capable of fixating large quantities of $CO_2$ into organic matter, which are both energetically efficient and capable of creating a usable feedstock of reduced carbon (so-called solar fuel) [2]. These new technologies can use a naturally abundant and sustainable source of energy. Early transition metal oxides, in particular titanium oxides, are capable of reducing $CO_2$ when excited by UV light [3]. Using sunlight to reduce $CO_2$ directly would be ideal; however, the majority of the sun's rays are in the visible-IR range [4], which is too low energy to induce photoreduction with these materials, limiting their applicability on environmentally relevant scales. Thus, materials that are able to reduce $CO_2$ with the use of visible light are an imminent and currently unfulfilled need. The materials discussed herein address these and other needs.

Disclosed herein are metal-organic frameworks. Metal-organic frameworks (MOFs) are a class of crystalline porous materials that exhibit high surface area and large pore volume. Metal-organic frameworks [5] are a class of porous materials composed of metal-oxide clusters connected through organic links forming highly crystalline open structures that offer a promising alternative to metal-oxide semiconductor photocatalysis. Research in the design and synthesis of new MOFs (reticular chemistry [6]) has allowed for the creation of functional materials with unprecedented high porosity (surface areas up to 10 000 $m^2\ g^{-1}$) [7] and exceptional chemical and thermal stability, with applications in gas storage [8], gas separation [9], heterogeneous catalysis [10], payload release [11], and sensing [12], among others. MOFs are materials with extraordinary chemical and functional versatility, because both the organic and inorganic components can be systematically varied towards targeted applications in a systematic manner [13].

Titanium based MOFs in particular combine the photocatalytic activity of titanium oxide clusters with the light absorption properties of organic linkers, producing materials that can be photocatalytically active under UV-visible light [14]. These catalytic reactions are facilitated through either oxidative [14a, 15], or reductive [16] photoinduced electron transfer within the Ti-MOF under irradiation. MIL-125-$NH_2$ (MIL=Materials Institut Lavoisier) is a titanium-based MOF constructed from 2-aminoterephthalate and a $Ti_8O_{12}$ ring-shaped cluster (FIG. 1) that has shown activity towards photocatalytic reduction of carbon dioxide [17]. The biggest challenge in increasing and optimizing this activity for operating in the visible range relies on tuning the bandgap (or HOMO-LUMO gap) of this material ($E_g$=2.56 eV). De Miguel et al. established that photo irradiation of MIL-125-$NH_2$ with UV-visible light produces a long-lived charge-separated state whose lifetime is directly related to photocatalytic activity [18]. Moreover, it has been demonstrated through high-level DFT calculations that this charge-separated excited state is accessible due to the difference in electronic distribution of the frontier bands/orbitals. In this MOF, the top of the valence band—or HOMO—is localized in the aromatic ring of the 2-aminoterephthatalate, and the bottom of the conduction band—or LUMO—is localized in the d-states of the titanium ions favoring charge separation upon photoexcitation [19]. They also propose that a strategy to decrease the bandgap of this MOF (and thus absorbing more visible light) is by destabilizing the valence band by increasing the electron density in the π-cloud of the terephthalate. It has been previously demonstrated that incorporating 2,5-diaminoterephthalate and 2-aminoterephthalate into the MIL-125 framework effectively decreases the optical band [19a]. Other efforts include post synthetic modification of MIL-125-$NH_2$ via diazotization of the amine followed by addition of an electron-rich aniline forming diazo-based groups on the surface of the MOF particles, which exhibit enhanced photooxidation of benzyl alcohols [15b].

SUMMARY

In accordance with the purposes of the disclosed compositions and methods, as embodied and broadly described herein, the disclosed subject matter relates to compositions and methods of making and using the compositions. More specifically, according to the aspects illustrated herein, disclosed are metal-organic frameworks and methods of making and use thereof.

Additional advantages of the disclosed compositions and methods will be set forth in part in the description which follows, and in part will be obvious from the description. The advantages of the disclosed compositions will be realized and attained by means of the elements and combinations particularly pointed out in the appended claims. It is to be understood that both the foregoing general description and the following detailed description are exemplary and explanatory only and are not restrictive of the disclosed compositions, as claimed.

The details of one or more embodiments of the invention are set forth in the accompanying drawings and the description below. Other features, objects, and advantages of the invention will be apparent from the description and drawings, and from the claims.

BRIEF DESCRIPTION OF THE FIGURES

The accompanying figures, which are incorporated in and constitute a part of this specification, illustrate several aspects of the disclosure, and together with the description, serve to explain the principles of the disclosure.

DETAILED DESCRIPTION

Figure 1:
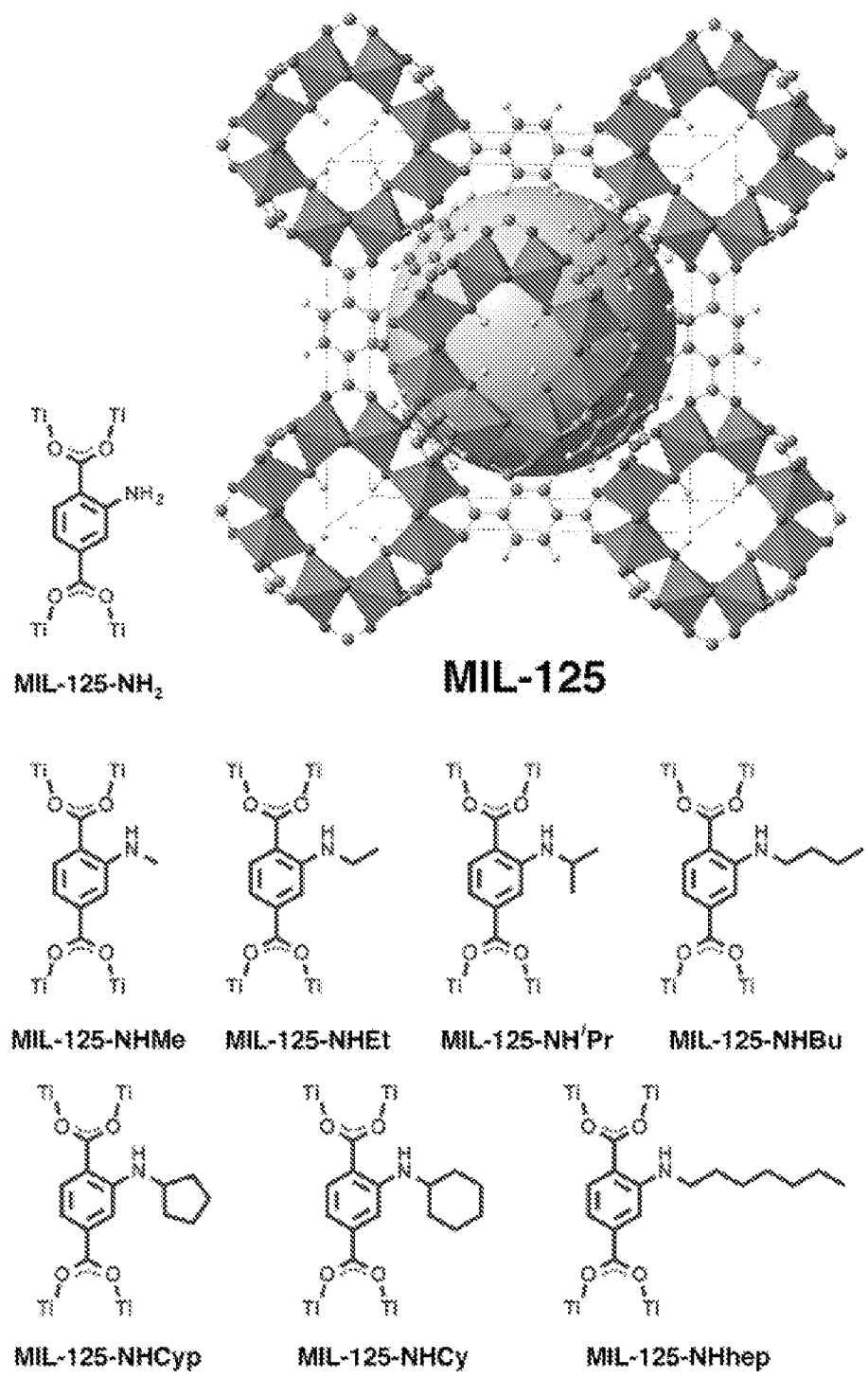
FIG. 1 is a schematic crystal structure of the parent MOF MIL-125 utilized in this study (top panel). Molecular structure of the organic link in MIL-125-NH2 and the N-substituted isoreticular MOFs prepared in this work (bottom panel). Gray spheres=carbon, white=hydrogen, red=oxygen, blue polyhedral=titanium, the yellow sphere represents the size of the pore in the MOF.

The metal-organic frameworks and methods described herein may be understood more readily by reference to the following detailed description of specific aspects of the disclosed subject matter and the Examples included therein.

Before the present metal-organic frameworks and methods are disclosed and described, it is to be understood that the aspects described below are not limited to specific synthetic methods or specific reagents, as such may, of course, vary. It is also to be understood that the terminology used herein is for the purpose of describing particular aspects only and is not intended to be limiting.

Also, throughout this specification, various publications are referenced. The disclosures of these publications in their entireties are hereby incorporated by reference into this application in order to more fully describe the state of the art to which the disclosed matter pertains. The references disclosed are also individually and specifically incorporated by reference herein for the material contained in them that is discussed in the sentence in which the reference is relied upon.

General Definitions

In this specification and in the claims that follow, reference will be made to a number of terms, which shall be defined to have the following meanings.

Throughout the description and claims of this specification the word "comprise" and other forms of the word, such as "comprising" and "comprises," means including but not limited to, and is not intended to exclude, for example, other additives, components, integers, or steps.

As used in the description and the appended claims, the singular forms "a," "an," and "the" include plural referents unless the context clearly dictates otherwise. Thus, for example, reference to "a composition" includes mixtures of two or more such compositions, reference to "an agent" includes mixtures of two or more such agents, reference to "the component" includes mixtures of two or more such components, and the like.

"Optional" or "optionally" means that the subsequently described event or circumstance can or cannot occur, and that the description includes instances where the event or circumstance occurs and instances where it does not.

Ranges can be expressed herein as from "about" one particular value, and/or to "about" another particular value. By "about" it is meant within 5% of the value, e.g., within 4, 3, 2, or 1% of the value. When such a range is expressed, another aspect includes from the one particular value and/or to the other particular value, the range beginning and end value are both included of the possible values, i.e., the range is mathematically a close rectangle. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

It is understood that throughout this specification the identifiers "first" and "second" are used solely to aid in distinguishing the various components and steps of the disclosed subject matter. The identifiers "first" and "second" are not intended to imply any particular order, amount, preference, or importance to the components or steps modified by these terms.

Chemical Definitions

References in the specification and concluding claims to parts by weight of a particular element or component in a composition denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

A weight percent (wt. %) of a component, unless specifically stated to the contrary, is based on the total weight of the formulation or composition in which the component is included.

As used herein, the term "substituted" is contemplated to include all permissible substituents of organic compounds. In a broad aspect, illustrative substituents include, acyclic and cyclic, branched and unbranched, carbocyclic and heterocyclic, and aromatic and nonaromatic substituents of organic compounds. Further examples of the permissible substituents will be described below. The permissible substituents can be one or more and the same or different for appropriate organic compounds. For purposes of this disclosure, the heteroatoms, such as nitrogen, can have hydrogen substituents and/or any permissible substituents of organic compounds described herein which satisfy the valencies of the heteroatoms. This disclosure is not intended to be limited in any manner by the permissible substituents of organic compounds. Also, the terms "substitution" or "substituted with" include the implicit proviso that such substitution is in accordance with permitted valence of the substituted atom and the substituent, and that the substitution results in a thermodynamically stable compound, e.g., a compound that does not spontaneously undergo transformation such as by rearrangement, cyclization, elimination, etc.

"$Z^1$," "$Z^2$," "$Z^3$," and "$Z^4$" are used herein as generic symbols to represent various specific substituents. These symbols can be any substituent, not limited to those disclosed herein, and when they are defined to be certain substituents in one instance, they can, in another instance, be defined as some other substituents.

The term "aliphatic" as used herein refers to a non-aromatic hydrocarbon group in which carbon atoms form an open chain, and includes branched and unbranched, alkyl, alkenyl, or alkynyl groups.

As used herein, the term "alkyl" refers to saturated, straight-chained or branched saturated hydrocarbon moieties. Unless otherwise specified, $C_1$-$C_{24}$ (i.e., moieties containing one (1) to twenty-four (24) carbon atoms)) alkyl groups are intended. Examples of alkyl groups include methyl, ethyl, propyl, 1-methyl-ethyl, butyl, and their homologues and isomers. Alkyl substituents may be unsubstituted or substituted with one or more chemical moieties. The alkyl group can be substituted with one or more groups including, but not limited to, hydroxyl, halogen, acyl, alkyl, alkoxy, alkenyl, alkynyl, aryl, heteroaryl, aldehyde, amino, cyano, carboxylic acid, ester, ether, ketone, nitro, phosphonyl, silyl, sulfo-oxo, sulfonyl, sulfone, sulfoxide, or thiol, as described below, provided that the substituents are sterically compatible and the rules of chemical bonding and strain energy are satisfied.

Throughout the specification "alkyl" is generally used to refer to both unsubstituted alkyl groups and substituted alkyl groups; however, substituted alkyl groups are also specifically referred to herein by identifying the specific substituent(s) on the alkyl group. For example, the term "halogenated alkyl" specifically refers to an alkyl group that is substituted with one or more halides (halogens; e.g., fluorine, chlorine, bromine, or iodine). The term "alkoxyalkyl" specifically refers to an alkyl group that is substituted with one or more alkoxy groups, as described below. The term "alkylamino" specifically refers to an alkyl group that is substituted with one or more amino groups, as described below, and the like. When "alkyl" is used in one instance and a specific term such as "alkylalcohol" is used in another, it is not meant to imply that the term "alkyl" does not also refer to specific terms such as "alkylalcohol" and the like.

This practice is also used for other groups described herein. That is, while a term such as "cycloalkyl" refers to both unsubstituted and substituted cycloalkyl moieties, the substituted moieties can, in addition, be specifically identified herein; for example, a particular substituted cycloalkyl can be referred to as, e.g., an "alkylcycloalkyl." Similarly, a substituted alkoxy can be specifically referred to as, e.g., a "halogenated alkoxy," a particular substituted alkenyl can be, e.g., an "alkenylalcohol," and the like. Again, the practice of using a general term, such as "cycloalkyl," and a specific term, such as "alkylcycloalkyl," is not meant to imply that the general term does not also include the specific term.

As used herein, the term "alkenyl" refers to unsaturated, straight-chained, or branched hydrocarbon moieties containing a double bond. Unless otherwise specified, $C_2$-$C_{24}$ (i.e., moieties containing two (2) to twenty-four (24) carbons)) alkenyl groups are intended. Alkenyl groups may contain more than one unsaturated bond. Examples include ethenyl, 1-propenyl, 2-propenyl, and their homolouges and isomers. The term "vinyl" refers to a group having the structure —CH=CH$_2$; 1-propenyl refers to a group with the structure -CH=CH—CH$_3$; and 2-propenyl refers to a group with the structure —CH$_2$—CH=CH$_2$. Asymmetric structures such as $(Z^1Z^2)C=C(Z^3Z^4)$ are intended to include both the E and Z isomers. This can be presumed in structural formulae herein wherein an asymmetric alkene is present, or it can be explicitly indicated by the bond symbol C=C. Alkenyl substituents may be unsubstituted or substituted with one or more chemical moieties. Examples of suitable substituents include, for example, alkyl, alkoxy, alkenyl, alkynyl, aryl, heteroaryl, acyl, aldehyde, amino, cyano, carboxylic acid, ester, ether, halide, hydroxyl, ketone, nitro, phosphonyl, silyl, sulfo-oxo, sulfonyl, sulfone, sulfoxide, or thiol, as described below, provided that the substituents are sterically compatible and the rules of chemical bonding and strain energy are satisfied.

As used herein, the term "alkynyl" represents straight-chained or branched hydrocarbon moieties containing a triple bond. Unless otherwise specified, $C_2$-$C_{24}$ (i.e., moieties containing one (1)) to twenty-four (24) carbons) alkynyl groups are intended. Alkynyl groups may contain more than one unsaturated bond. Examples include $C_2$-$C_6$-alkynyl, such as ethynyl, 1-propynyl, 2-propynyl (or propargyl), 1-butynyl, and their homolouges and isomers. Alkynyl substituents may be unsubstituted or substituted with one or more chemical moieties. Examples of suitable substituents include, for example, alkyl, alkoxy, alkenyl, alkynyl, aryl, heteroaryl, acyl, aldehyde, amino, cyano, carboxylic acid, ester, ether, halide, hydroxyl, ketone, nitro, phosphonyl, silyl, sulfo-oxo, sulfonyl, sulfone, sulfoxide, or thiol, as described below.

As used herein, the term "aryl," as well as derivative terms such as aryloxy, refers to groups that include a monovalent aromatic carbocyclic group of from 3 to 50 carbon atoms. Aryl groups can include a single ring or multiple condensed rings. In some embodiments, aryl groups include $C_6$-$C_{10}$ aryl groups. Examples of aryl groups include, but are not limited to, benzene, phenyl, biphenyl, naphthyl, tetrahydronaphtyl, phenylcyclopropyl, phenoxybenzene, and indanyl. The term "aryl" also includes "heteroaryl," which is defined as a group that contains an aromatic group that has at least one heteroatom incorporated within the ring of the aromatic group. Examples of heteroatoms include, but are not limited to, nitrogen, oxygen, sulfur, and phosphorus. The term "non-heteroaryl," which is also included in the term "aryl," defines a group that contains an aromatic group that does not contain a heteroatom. The aryl substituents may be unsubstituted or substituted with one or more chemical moieties. Examples of suitable substituents include, for example, alkyl, alkoxy, alkenyl, alkynyl, aryl, heteroaryl, acyl, aldehyde, amino, cyano, carboxylic acid, ester, ether, halide, hydroxyl, ketone, nitro, phosphonyl, silyl, sulfo-oxo, sulfonyl, sulfone, sulfoxide, or thiol as described herein. The term "biaryl" is a specific type of aryl group and is included in the definition of aryl. Biaryl refers to two aryl groups that are bound together via a fused ring structure, as in naphthalene, or are attached via one or more carbon-carbon bonds, as in biphenyl.

The term "cycloalkyl" as used herein is a non-aromatic carbon-based ring composed of at least three carbon atoms. Examples of cycloalkyl groups include, but are not limited to, cyclopropyl, cyclobutyl, cyclopentyl, cyclohexyl, etc. The term "heterocycloalkyl" is a cycloalkyl group as defined above where at least one of the carbon atoms of the ring is substituted with a heteroatom such as, but not limited to, nitrogen, oxygen, sulfur, or phosphorus. The cycloalkyl group and heterocycloalkyl group can be substituted or unsubstituted. The cycloalkyl group and heterocycloalkyl group can be substituted with one or more groups including, but not limited to, alkyl, alkoxy, alkenyl, alkynyl, aryl, heteroaryl, acyl, aldehyde, amino, cyano, carboxylic acid, ester, ether, halide, hydroxyl, ketone, nitro, phosphonyl, silyl, sulfo-oxo, sulfonyl, sulfone, sulfoxide, or thiol as described herein.

The term "cycloalkenyl" as used herein is a non-aromatic carbon-based ring composed of at least three carbon atoms and containing at least one double bound, i.e., C=C. Examples of cycloalkenyl groups include, but are not limited to, cyclopropenyl, cyclobutenyl, cyclopentenyl, cyclopentadienyl, cyclohexenyl, cyclohexadienyl, and the like. The term "heterocycloalkenyl" is a type of cycloalkenyl group as defined above, and is included within the meaning of the term "cycloalkenyl," where at least one of the carbon atoms of the ring is substituted with a heteroatom such as, but not limited to, nitrogen, oxygen, sulfur, or phosphorus. The cycloalkenyl group and heterocycloalkenyl group can be substituted or unsubstituted. The cycloalkenyl group and heterocycloalkenyl group can be substituted with one or more groups including, but not limited to, alkyl, alkoxy, alkenyl, alkynyl, aryl, heteroaryl, acyl, aldehyde, amino, cyano, carboxylic acid, ester, ether, halide, hydroxyl, ketone, nitro, phosphonyl, silyl, sulfo-oxo, sulfonyl, sulfone, sulfoxide, or thiol as described herein.

The term "cyclic group" is used herein to refer to either aryl groups, non-aryl groups (i.e., cycloalkyl, heterocycloalkyl, cycloalkenyl, and heterocycloalkenyl groups), or both. Cyclic groups have one or more ring systems that can be substituted or unsubstituted. A cyclic group can contain one or more aryl groups, one or more non-aryl groups, or one or more aryl groups and one or more non-aryl groups.

The term "acyl" as used herein is represented by the formula —C(O)$Z^1$ where $Z^1$ can be a hydrogen, hydroxyl, alkoxy, alkyl, alkenyl, alkynyl, aryl, heteroaryl, cycloalkyl, cycloalkenyl, heterocycloalkyl, or heterocycloalkenyl group described above. As used herein, the term "acyl" can be used interchangeably with "carbonyl." Throughout this specification "C(O)" or "CO" is a short hand notation for C=O.

The term "acetal" as used herein is represented by the formula ($Z^1Z^2$)C(=O$Z^3$)(=O$Z^4$), where $Z^1$, $Z^2$, $Z^3$, and $Z^4$ can be, independently, a hydrogen, halogen, hydroxyl, alkyl, alkenyl, alkynyl, aryl, heteroaryl, cycloalkyl, cycloalkenyl, heterocycloalkyl, or heterocycloalkenyl group described above.

As used herein, the term "alkoxy" as used herein is an alkyl group bound through a single, terminal ether linkage; that is, an "alkoxy" group can be defined as to a group of the formula $Z^1$—O—, where $Z^1$ is unsubstituted or substituted alkyl as defined above. Unless otherwise specified, alkoxy groups wherein $Z^1$ is a $C_1$-$C_{24}$ (i.e., moieties containing one (1)) to twenty-four (24) carbons) alkyl group are intended. Examples include methoxy, ethoxy, propoxy, 1-methylethoxy, butoxy, and their homolouges and isomers.

The term "aldehyde" as used herein is represented by the formula —C(O)H. Throughout this specification "C(O)" is a short hand notation for C=O.

The terms "amine" or "amino" as used herein are represented by the formula —N$Z^1Z^2Z^3$, where $Z^1$, $Z^2$, and $Z^3$ can each be substitution group as described herein, such as hydrogen, an alkyl, alkenyl, alkynyl, aryl, heteroaryl, cycloalkyl, cycloalkenyl, heterocycloalkyl, or heterocycloalkenyl group described above.

The terms "amide" or "amido" as used herein are represented by the formula —C(O)N$Z^1Z^2$, where $Z^1$ and $Z^2$ can each be substitution group as described herein, such as hydrogen, an alkyl, alkenyl, alkynyl, aryl, heteroaryl, cycloalkyl, cycloalkenyl, heterocycloalkyl, or heterocycloalkenyl group described above.

The term "carboxylic acid" as used herein is represented by the formula —C(O)OH. A "carboxylate" or "carboxyl" group as used herein is represented by the formula —C(O)O$^-$.

The term "cyano" as used herein is represented by the formula —CN.

The term "ester" as used herein is represented by the formula —OC(O)Z$^1$ or —C(O)OZ$^1$, where Z$^1$ can be an alkyl, alkenyl, alkynyl, aryl, heteroaryl, cycloalkyl, cycloalkenyl, heterocycloalkyl, or heterocycloalkenyl group described above.

The term "ether" as used herein is represented by the formula Z$^1$OZ$^2$, where Z$^1$ and Z$^2$ can be, independently, an alkyl, alkenyl, alkynyl, aryl, heteroaryl, cycloalkyl, cycloalkenyl, heterocycloalkyl, or heterocycloalkenyl group described above.

The term "ketone" as used herein is represented by the formula Z$^1$C(O)Z$^2$, where Z$^1$ and Z$^2$ can be, independently, an alkyl, alkenyl, alkynyl, aryl, heteroaryl, cycloalkyl, cycloalkenyl, heterocycloalkyl, or heterocycloalkenyl group described above.

The term "halide" or "halogen" or "halo" as used herein refers to fluorine, chlorine, bromine, and iodine.

The term "hydroxyl" as used herein is represented by the formula —OH.

The term "nitro" as used herein is represented by the formula —NO$_2$.

The term "phosphonyl" is used herein to refer to the phospho-oxo group represented by the formula —P(O)(OZ$^1$)$_2$, where Z$^1$ can be hydrogen, an alkyl, alkenyl, alkynyl, aryl, heteroaryl, cycloalkyl, cycloalkenyl, heterocycloalkyl, or heterocycloalkenyl group described above.

The term "silyl" as used herein is represented by the formula —SiZ$^1$Z$^2$Z$^3$, where Z$^1$, Z$^2$, and Z$^3$ can be, independently, hydrogen, alkyl, alkoxy, alkenyl, alkynyl, aryl, heteroaryl, cycloalkyl, cycloalkenyl, heterocycloalkyl, or heterocycloalkenyl group described above.

The term "sulfonyl" or "sulfone" is used herein to refer to the sulfo-oxo group represented by the formula —S(O)$_2$Z$^1$, where Z$^1$ can be hydrogen, an alkyl, alkenyl, alkynyl, aryl, heteroaryl, cycloalkyl, cycloalkenyl, heterocycloalkyl, or heterocycloalkenyl group described above.

The term "sulfide" as used herein is comprises the formula —S—.

The term "thiol" as used herein is represented by the formula —SH.

"R$^1$," "R$^2$," "R$^3$," "R$^n$," etc., where n is some integer, as used herein can, independently, possess one or more of the groups listed above. For example, if R$^1$ is a straight chain alkyl group, one of the hydrogen atoms of the alkyl group can optionally be substituted with a hydroxyl group, an alkoxy group, an amine group, an alkyl group, a halide, and the like. Depending upon the groups that are selected, a first group can be incorporated within second group or, alternatively, the first group can be pendant (i.e., attached) to the second group. For example, with the phrase "an alkyl group comprising an amino group," the amino group can be incorporated within the backbone of the alkyl group. Alternatively, the amino group can be attached to the backbone of the alkyl group. The nature of the group(s) that is (are) selected will determine if the first group is embedded or attached to the second group.

Unless stated to the contrary, a formula with chemical bonds shown only as solid lines and not as wedges or dashed lines contemplates each possible molecular conformation, including but not limited to enantiomer, stereoisomer or mixtures thereof Reference will now be made in detail to specific aspects of the disclosed materials, compounds, compositions, formulations, articles, and methods, examples of which are illustrated in the accompanying Examples and Figures.

Herein, the synthesis of a family of titanium MOFs isoreticular to MIL-125-NH$_2$ is described, where the amine functionality is decorated with alkyl chains of varying length and connectivity, i.e., methyl, ethyl, isopropyl, n-butyl, cyclopentyl, cyclohexyl, and n-heptyl (FIG. 1). The rationale for this functionalization strategy relies on the hypothesis that sequential addition of carbon atoms in the N-alkyl amino group can result in increased electron density in the terephthalate ring as a consequence of subtle inductive effects. These electronic effects result from the polarization of a chemical species through σ-bonds due to differences in electronegativity between a heteroatom (in this case nitrogen) and the carbon atoms in the alkyl chains. Moreover, these effects should be more evident in secondary and tertiary alkyls [20]. Thus, increasing the number of σ-bonds in the chain should result in larger electron density around the nitrogen atom in 2-aminoterephthalate, causing an increased density in the aromatic ring, and therefore destabilizing the top of the valence band. By successively destabilizing the valence band in small steps, the bandgap of the MOFs should decrease, and higher photocatalytic activity can be achieved under visible irradiation. The effect of the N-alkyl substitution on the CO$_2$ adsorption was studied, as well as the photophysical and photocatalytic properties of the materials, particularly the absorption onset, and excited state lifetimes. These parameters were also studied to understand the photocatalytic activity towards reduction of CO$_2$ utilizing visible light only, in the form of blue light emitting diodes (LEDs).

In specific embodiments, disclosed herein are metal-organic frameworks comprising titanium oxide clusters connected through an organic linker, wherein the organic linker comprises:

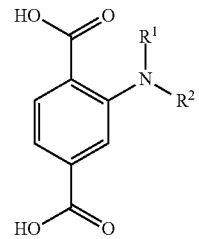

wherein R$^1$ and R$^2$ are independently selected from the group consisting of H, substituted or unsubstituted C$_1$-C$_{14}$ alkyl, and substituted or unsubstituted C$_1$-C$_{14}$ cycloalkyl.

In some examples, R$^1$ and R$^2$ are independently selected from H, unsubstituted linear or branched C$_1$-C$_{14}$ alkyl, and unsubstituted C$_1$-C$_{14}$ cycloalkyl. In some examples, R$^1$ is H and R$^2$ is selected from the group consisting of unsubstituted linear or branched C$_1$-C$_7$ alkyl and unsubstituted C$_1$-C$_7$ cycloalkyl. In some examples, R$^1$ is H and R$^2$ is selected from the group consisting of methyl, ethyl, isopropyl, n-butyl, cyclopentyl, cyclohexyl, and n-heptyl.

In some examples, the titanium oxide clusters comprise Ti$_8$O$_{12}$ ring shaped clusters.

Also disclosed herein are metal-organic frameworks comprising:

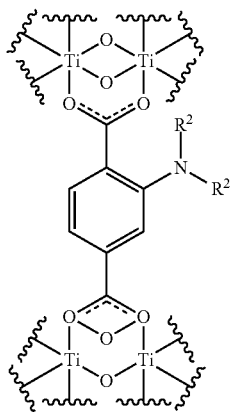

wherein $R^1$ and $R^2$ are independently selected from the group consisting of H and substituted or unsubstituted $C_1$-$C_{14}$ alkyl.

In some examples, $R^1$ and $R^2$ are independently selected from H, unsubstituted linear or branched $C_1$-$C_{14}$ alkyl, and unsubstituted $C_1$-$C_{14}$ cycloalkyl. In some examples, $R^1$ is H and $R^2$ is selected from the group consisting of unsubstituted linear or branched $C_1$-$C_7$ alkyl and unsubstituted $C_1$-$C_7$ cycloalkyl. In some examples, $R^1$ is H and $R^2$ is selected from the group consisting of methyl, ethyl, isopropyl, n-butyl, cyclopentyl, cyclohexyl, and n-heptyl.

In some examples, the metal-organic framework can have a crystal structure in the high symmetry tetragonal I4/mmm space group with low residuals.

In some examples, the metal-organic framework can have a BET surface area of from 100 $m^2/g$ to 2000 $m^2/g$ (e.g., from 200 $m^2/g$ to 1000 $m^2/g$).

In some examples, the metal-organic framework can have a total pore volume of from 0.05 $cm^3/g$ to 1.5 $cm^3/g$ (e.g., from 0.09 $cm^3/g$ to 0.73 $cm^3/g$).

In some examples, the metal-organic framework can have an adsorption capacity for $CO_2$ gas of from 5 to 500 $cm^3$ of $CO_2$ gas per g of metal-organic framework (e.g., from 19 to 225 $cm^3$ of $CO_2$ gas per g of metal-organic framework).

In some examples, the metal-organic framework has a bandgap of from 2.15 eV to 2.9 eV Methods of Making Also disclosed herein are methods of making the metal-organic frameworks disclosed herein. The methods can, for example, comprise contacting a titanium oxide cluster with an organic linker to form the metal-organic framework. In some examples, the metal-organic framework can be formed at room temperature.

Methods of Use

Also disclosed herein are methods of use of the metal-organic frameworks described herein. The methods can comprise using the metal-organic framework as a catalyst in the photocatalytic reduction of $CO_2$. For example, the methods can comprise contacting the metal-organic framework with $CO_2$ to form a mixture and illuminating the mixture with light that at least partially overlaps with the bandgap of the metal-organic framework. In some examples, the $CO_2$ can be reduced at an initial rate of reaction of from $5.5 \times 10^{-6}$ to $1.25 \times 10^{-5}$ mol $L^{-1}$ $h^{-1}$. In some examples, the apparent quantum yield is from 0.3% to 1.8%.

Also disclosed herein are $CO_2$ reduction catalysts, the catalysts comprising the metal-organic frameworks described herein.

A number of embodiments of the invention have been described. Nevertheless, it will be understood that various modifications may be made without departing from the spirit and scope of the invention. Accordingly, other embodiments are within the scope of the following claims.

The examples below are intended to further illustrate certain aspects of the systems and methods described herein, and are not intended to limit the scope of the claims.

EXAMPLES

The following examples are set forth below to illustrate the methods and results according to the disclosed subject matter. These examples are not intended to be inclusive of all aspects of the subject matter disclosed herein, but rather to illustrate representative methods and results. These examples are not intended to exclude equivalents and variations of the present invention which are apparent to one skilled in the art.

Efforts have been made to ensure accuracy with respect to numbers (e.g., amounts, temperature, etc.) but some errors and deviations should be accounted for. Unless indicated otherwise, parts are parts by weight, temperature is in ° C. or is at ambient temperature, and pressure is at or near atmospheric. There are numerous variations and combinations of measurement conditions, e.g., component concentrations, temperatures, pressures and other measurement ranges and conditions that can be used to optimize the described process.

Example 1

A series of metal-organic frameworks (MOFs) isoreticular to MIL-125-$NH_2$ were prepared, where the 2-amino-terephthalate organic links feature N-alkyl groups of increasing chain length (from methyl to heptyl) and varying connectivity (primary and secondary). The prepared materials display reduced optical bandgaps correlated to the inductive donor ability of the alkyl substituent as well as high photocatalytic activity towards the reduction of carbon dioxide under blue illumination operating over 120 h. Secondary N-alkyl substitution (isopropyl, cyclopentyl and cyclohexyl) exhibit larger apparent quantum yields than the primary N-alkyl analogs directly correlated to their longer lived excited-state lifetime. In particular, MIL-125-NHCyp (Cyp=cyclopentyl) exhibits a small bandgap ($E_g$=2.30 eV) and the larger apparent quantum yield ($\Phi_{app}$=1.80%) compared to the parent MIL-125-$NH_2$ ($E_g$=2.56 eV, $\Phi_{app}$=0.31%), making it a promising candidate for the next generation of photocatalysts for solar fuel production based on earth-abundant elements.

All starting materials and solvents, unless otherwise specified, were obtained from commercial sources (Aldrich, Fisher, VWR) and used without further purification. All reactions were performed at ambient laboratory conditions, and no precautions were taken to exclude oxygen or atmospheric moisture unless otherwise specified. Anhydrous N,N-dimethylformamide (DMF) and tetrahydrofuran (THF) were purified using a custom-built alumina-column based solvent purification system (Inovative Technology). Anhydrous methanol was obtained from Aldrich (Sureseal). Mesitylene and hexamethylphosphoramide (HMPA) were dried over activated 4 Å molecular sieves. Deuterated solvents ($CDCl_3$, DMSO, $D_2O$, $CD_3CN$, NaOD 40% in $D_2O$) were obtained from Cambridge Isotope Lab.

High-resolution $^1H$ and $^{13}C$ nuclear magnetic resonance (NMR) spectra were collected using Bruker AVANCE-III 400 MHz spectrometer. The chemical shifts are reported relative to solvent residual signal. NMR data analysis was preformed using MestReNova (v. 10.0.2). Liquid chromatography-mass spectra (LC-MS) were recorded using Agilent 6230 TOF with an Agilent Zorbax SB-C18 analytical column. Fourier-transform infrared (FTIR) spectra were performed using a Perkin Elmer Spectrum ONE Universal FT-IR ATR. 32 scans were collected for each sample at a resolution of 0.5 cm$^{-1}$ from 4000-650 cm$^{-1}$. Scanning electron microscopy (SEM) was conducted using a JEOL JSM 6480 microscope on low-vacuum with an accelerating voltage of 20 kV. Sample preparation involved the dispersion of samples upon carbon tape attached to stainless steel sample holder.

Powder X-ray diffraction (PXRD) data was collected using a Rigaku MiniFlex 600 θ-2θ diffractometer in Bragg-Brentano geometry with a 300 mm goniometer diameter, Ni-filtered CuKα radiation (λ=1.5418 Å) at 600 W power (40 kV, 15 mA), equipped with a NaI(Tl) SC-70 scintillation detector, 5.0° incident and receiving Soller slits, a 0.625° divergent slit, a 1.25° scattering slit, a 0.3 mm receiving slit and a Ni-CuKβ filter. Samples were analyzed from 3 to 40 2θ-degrees with 0.02° per step and a scan rate of 0.25 2θ-degrees min$^{-1}$. Samples were prepared by dropping the powder sample in a glass sample holder and pressing the powder with a razor blade spatula forming a smooth surface. Crystal models were created using Materials Studio modeling suite [21] starting from the published crystal of MIL-125 (CCDC code RUPRUQ) [14a] by adding the corresponding N-alkyl chains.

Crystal modeling and Rietveld refinements. Rietveld refinements were performed in GSAS-II [22] with the experimental diffractograms, and the respective crystal model generated in Materials Studio. Refinements were performed using a Thomson-Cox-Hasting modified pseudo-Voigt function with 6 terms, and Finger-Cox-Jephcoat peak asymmetry with 1 parameter. Crystallographic information for the Rietveld Refinement are summarized in Table 1-Table 3.

TABLE 1

Crystallographic information from Rietveld Refinement.

| Name | MIL-125-NHMe | MIL-125-NHMEt | MIL-125-NH$^i$Pr |
|---|---|---|---|
| Asymmetric unit composition | $C_{1.395}N_{0.315}O_{2.415}Ti_{0.25}$ | $C_{1.785}N_{0.315}O_{2.148}Ti_{0.25}$ | $C_{2.175}N_{0.315}O_{3.017}Ti_{0.25}$ |
| Formula weight (g mol$^{-1}$) | 71.78 | 72.19 | 90.78 |
| Temperature (K.) | 300 | 300 | 300 |
| Z | 32 | 32 | 32 |
| Crystal system | tetragonal | tetragonal | tetragonal |
| Space Group | I4/mmm (No. 123) | I4/mmm (No. 123) | I4/mmm (No. 123) |
| a (Å) | 18.635(16) | 18.626(20) | 18.70(5) |
| c (Å) | 18.131(14) | 18.088(18) | 18.11(5) |
| V (Å$^3$) | 6296(15) | 6275(20) | 6330(50) |
| Number of independent atoms | 23 | 27 | 29 |
| Observed reflections | 104 | 103 | 104 |
| Number of data points | 1900 | 1850 | 1850 |
| Max d-spacing resolution (Å) | 13.177 | 13.171 | 13.226 |
| Min d-spacing resolution (Å) | 2.256 | 2.259 | 2.263 |
| Refined parameters (total) | 53 | 66 | 97 |
| $R_p$ (%) | 6.478 | 6.175 | 12.331 |
| $wR_p$ (%) | 8.686 | 8.551 | 21.211 |
| $R_B$ (%) | 5.966 | 5.884 | 13.300 |
| GOF ($\chi^2$) | 6.26 | 6.35 | 14.27 |

TABLE 2

Crystallographic information from Rietveld Refinement.

| Name | MIL-125-NHBu | MIL-125-NHCyp | MIL-125-NHCy |
|---|---|---|---|
| Asymmetric unit composition | $C_{2.995}N_{0.315}O_{2.833}Ti_{0.25}$ | $C_{2.955}N_{0.315}O_{2.149}Ti_{0.25}$ | $C_{3.345}N_{0.315}O_{2.019}Ti_{0.25}$ |
| Formula weight (g mol$^{-1}$) | 97.68 | 86.26 | 88.86 |
| Temperature (K.) | 300 | 300 | 300 |
| Z | 32 | 32 | 32 |
| Crystal system | tetragonal | tetragonal | tetragonal |
| Space Group | I4/mmm (No. 123) | I4/mmm (No. 123) | I4/mmm (No. 123) |
| a (Å) | 18.70(4) | 18.682(29) | 18.675(23) |
| c (Å) | 18.21(4) | 18.204(28) | 18.147(22) |

TABLE 2-continued

Crystallographic information from Rietveld Refinement.

| Name | MIL-125-NHBu | MIL-125-NHCyp | MIL-125-NHCy |
|---|---|---|---|
| V (Å$^3$) | 6370(40) | 6354(29) | 6329(23) |
| Number of independent atoms | 27 | 34 | 35 |
| Observed reflections | 104 | 92 | 100 |
| Number of data points | 1850 | 1850 | 1850 |
| Max d-spacing resolution (Å) | 13.225 | 13.210 | 13.205 |
| Min d-spacing resolution (Å) | 2.264 | 2.364 | 2.282 |
| Refined parameters (total) | 69 | 61 | 70 |
| $R_p$ (%) | 12.135 | 7.869 | 3.969 |
| $wR_p$ (%) | 20.323 | 13306 | 5.597 |
| $R_B$ (%) | 13.303 | 7.777 | 3.445 |
| GOF ($\chi^2$) | 13.18 | 7.60 | 3.502 |

TABLE 3

Crystallographic information from Rietveld Refinement.

| Name | MIL-125-NHhep |
|---|---|
| Asymmetric unit composition | $C_{3.735}N_{0.315}O_{2.361}Ti_{0.25}$ |
| Formula weight (g mol$^{-1}$) | 99.02 |
| Temperature (K.) | 300 |
| Z | 32 |
| Crystal system | tetragonal |
| Space Group | I4/mmm (No. 123) |
| a (Å) | 18.854(27) |
| c (Å) | 18.292(23) |
| V (Å$^3$) | 6502(27) |
| Number of independent atoms | 36 |
| Observed reflections | 88 |
| Number of data points | 1850 |
| Max d-spacing resolution (Å) | 13.332 |
| Min d-spacing resolution (Å) | 2.464 |
| Refined parameters (total) | 63 |
| $R_p$ (%) | 6.291 |
| $wR_p$ (%) | 9.196 |
| $R_B$ (%) | 7.049 |
| GOF ($\chi^2$) | 5.62 |

Gas adsorption isotherm analysis was performed using a Micromeritics ASAP 2020 surface area and porosimetry analyzer. Measurements were performed at 77 K (liquid $N_2$ bath) for $N_2$(g), and at 273, 283 and 293 K (water circulator bath) for $CO_2$ (g) on thermally activated samples. Brunauer-Emmet-Teller (BET) surface areas were obtained by performing a Rouquerol analysis over the linear isotherm to determine the upper limits of the BET model from the $N_2$ isotherms. Least squares linear fitting over the BET plot provided the parameter for the volume of the monolayer, BET surface area and C-constant were obtained following the recommendation by Snurr et al. for determination of the surface area in MOFs [23]. Differential enthalpies of $CO_2$ adsorption were obtained by fitting the isotherms at the three measured temperatures into a virial equation using the Micromeritics data processing software.

Solid-state absorption spectra were collected at room temperature using an Edinburgh FLS980 spectrometer with the integrating sphere accessory. Light output from a housed 450 W Xe lamp was passed through a single grating (1800/mm, 250 nm blaze) Czerny-Turner monochromator and then into the integrating sphere containing powder MIL-125-NHR sample or scattering reference (BaSO$_4$). The output from the integrating sphere was passed through a single grating (1800λ/mm, 500 nm blaze) Czerny-Turner and finally detected by a peltier-cooled Hamamatsu R928 photomultiplier tube. Synchronous spectral scans were performed with both excitation and emission monochromators, with zero wavelength offset, stepping through the pre-set spectral range. Absorbance was then calculated using Edinburgh's F900 software package. Tauc plots were obtained assuming $\alpha(h\nu)=(Ah\nu)^2$.

Transient Absorption (TA) Measurements:

Samples for TA were prepared by suspending MIL-125-NHR in ~3.0 mL of MeCN in a 1 cm×1 cm quartz cuvette (A≈0.2 O.D.). Measurements were performed on a spectrometer composed of a Continuum Surelite EX Nd:YAG laser combined with a Continuum Horizon OPO ($\lambda_{ex}$=405 nm, 5-7 ns, operated at 1 Hz, beam diameter ~0.5 cm, 5 mJ/pulse) integrated into a commercially available Edinburgh LP980 laser flash photolysis spectrometer. White light probe pulses generated by a pulsed 150 W Xe lamp were passed through the sample, focused into the monochromator, and then, for full spectrum data, were detected by intensified Andor iStar CCD camera. Single wavelength kinetic absorption at 500 nm were detected by a photomultiplier tube with a 435 nm long pass filter placed before the detector to reject unwanted scattered light. Detector outputs were processed using a Tektronix TDS3012C Digital Phosphor Oscilloscope interfaced to a PC. Single wavelength kinetic data were the result of averaging 50 laser shots. Detector outputs were processed using Edinburgh's L900 (version 8.2.3, build 0) software package. Time-resolved absorption data were fit with the exponential function in Equation 1:

$$I=I_o e^{-t/\tau} \quad \text{eq. (1)}$$

where τ is the lifetime.

Synthesis of MOF Building Block

Synthesis of N-alkyl-2-amino-terephthalate dimethyl ester (1a-d, 1g)

The isoreticular family of MOFs was prepared via $S_N2$ reaction of 2-amino terephthalate dimethyl ester (Scheme 1) with the corresponding alkyl iodide in basic conditions forming intermediates 1a-d and 1g in moderate yields. Specifically, 2-amino-terepthlate dimethyl ester (2.00 g, 9.56 mmol) was suspended in anhydrous DMF (20 mL) and stirred until fully dissolved (HMPA was used instead of DMF for 1g). $K_2CO_3$ (5.30 g, 38.2 mmol) was added, followed by dropwise addition of alkyl iodide (14.3 mmol), and the mixture was stirred for 18 h at 100° C. The reaction mixture was then cooled to room temperature and quenched with 2 M HCl (aq) to a pH=3. The mixture was extracted with EtOAc (3×50 mL), the combined organic extracts were washed with brine (3×50 mL), dried over anhydrous $MgSO_4$, filtered through celite and the solvent was removed using a rotary evaporator. The obtained crude was purified using flash chromatography ($SiO_2$, 15% v/v EtOAc:hexanes, dry loading).

Scheme 1. Synthesis of isoreticular MIL-125-NHR MOFs.

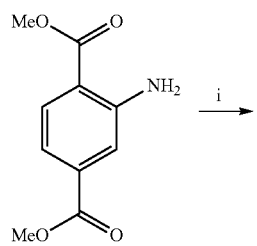

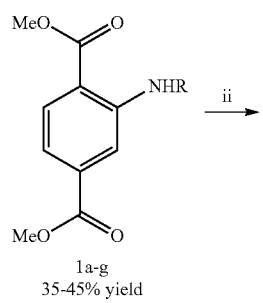
1a-g
35-45% yield

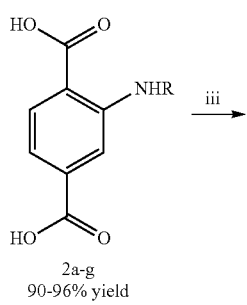
2a-g
90-96% yield

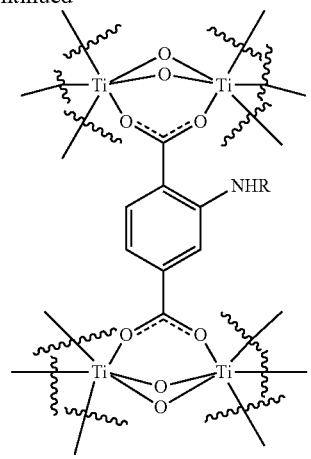
MIL-125-NHR
56-66% yield

R = Me a
Et b
$^i$Pr c
Bu d
Cyp e
Cy f
hep g

Conditions: ia (R=Me, Et, $^i$Pr, Bu, hep) RI, $K_2CO_3$, DMF/HPMA, 100° C., 18 h. ib (R=Cyp, Cy) cycloketone, TMSCl, $NaBH_4$, DMF, $N_2$ (g), 0° C., 15 min. ii. NaOH, THF, 70° C., 8 h. iii. Ti($O^iPr$)$_4$, DMF, MeOH, 150° C., 48 h.

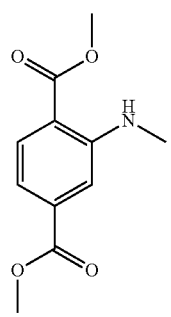 [SMILES: CNc1cc(C(=O)OC)ccc1C(=O)OC]

Compound 1a: Yellow solid, yield 0.89 g (45%). $^1$H NMR (400 MHz, CDCl$_3$) δ=7.84 (dd, J=8.3, 1.7 Hz, 1H), 7.61 (br, NH), 7.24 (s, br, 1H), 7.11 (d, J=8.3 Hz, 1H), 3.85 (s, 3H), 3.79 (s, 3H), 2.88 (d, J=5.2 Hz, 3H) (FIG. 95). $^{13}$C NMR (100 MHz, CDCl$_3$) δ=168.34, 166.77, 151.48, 134.99, 131.52, 114.59, 112.87, 111.83, 52.15, 51.58, 29.49 (FIG. 96). HRMS (ESI-TOF) m/z calculated for $C_6H_{13}NO_3$ [M+H]$^+$: 224.0917, found 224.0921.

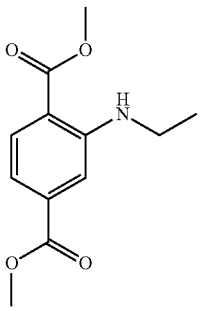 [SMILES: CCNc1cc(C(=O)OC)ccc1C(=O)OC]

Compound 1b: Yellow solid, yield 0.80 g (40%). $^1$H NMR (400 MHz, CDCl$_3$) δ=7.89 (d, J=8.3 Hz, 1H), 7.59 (br, NH), 7.29 (d, J=1.7 Hz, 1H), 7.13 (dd, J=8.3, 1.6 Hz, 1H), 3.87 (s, 3H), 3.83 (s, 3H), 3.24 (qd, J=7.2, 4.9 Hz, 2H), 1.30 (t, J=7.2 Hz, 3H) (FIG. 97). $^{13}$C NMR (100 MHz, CDCl$_3$) δ=168.51, 166.97, 150.74, 135.09, 131.68, 114.54, 112.75, 112.41, 52.26, 51.68, 37.51, 14.47 (FIG. 98). HRMS (ESI-TOF) m/z calculated for C$_6$H$_{13}$NO$_3$ [M+H]$^+$: 238.1074, found 238.1055.

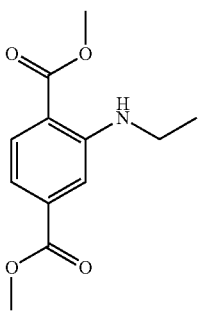 [SMILES: CCNc1cc(C(=O)OC)ccc1C(=O)OC]

Compound 1c: Yellow solid, yield 0.67 g (34%). $^1$H NMR (400 MHz, CDCl$_3$) δ=7.91 (d, J=8.3 Hz, 1H), 7.68 (br, NH), 7.35 (s, 1H), 7.13 (d, J=8.4 Hz, 1H), 3.89 (s, 3H), 3.84 (s, 3H), 3.79 (m, 1H), 1.27 (d, J=6.3 Hz, 6H) (FIG. 99). $^{13}$C NMR (100 MHz, CDCl$_3$) δ=168.68, 167.04, 150.11, 135.15, 131.98, 114.32, 112.98, 112.74, 52.35, 51.74, 43.50, 22.86 (FIG. 100). HRMS (ESI-TOF) m/z calculated for C$_6$H$_{13}$NO$_3$ [M+H]$^+$: 252.1230, found 252.1226.

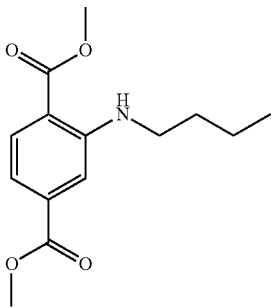 [SMILES: CCCCNc1cc(C(=O)OC)ccc1C(=O)OC]

Compound 1d: Yellow solid, yield 0.75 g (38%). $^1$H NMR (400 MHz, CDCl$_3$) δ=7.87 (d, J=8.4 Hz, 1H), 7.67 (br, NH), 7.29 (s, 1H), 7.12 (d, J=8.2 Hz, 1H), 3.87 (s, 3H), 3.83 (s, 3H), 3.23-3.17 (m, 2H), 1.69-1.61 (m, 2H), 1.50-1.40 (m, 3H), 0.97-0.92 (t, J=7.4, 3H). $^{13}$C NMR (100 MHz, CDCl$_3$) δ=168.55, 166.92, 150.91, 135.08, 131.70, 114.47, 112.69, 112.44, 52.24, 51.66, 42.62, 31.22, 20.36, 13.87. HRMS (ESI-TOF) m/z calculated for C$_6$H$_{13}$NO$_3$ [M+H]$^+$: 266.1387, found 266.1364.

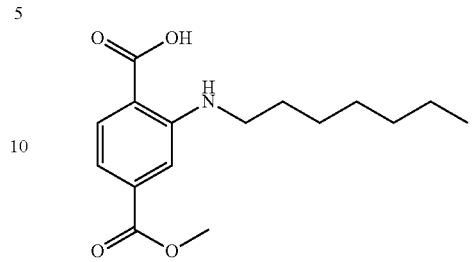

Compound 1g: Yellow liquid, yield 0.53 g (42%). $^1$H NMR (400 MHz, Chloroform-d) δ=7.93 (d, J=8.3 Hz, 1H), 7.70 (br, NH), 7.34 (d, J=1.6 Hz, 1H), 7.17 (dd, J=8.3, 1.6 Hz, 1H), 4.12 (t, J=6.7 Hz, 2H), 3.92 (s, 3H), 3.87 (s, 3H), 1.56 (d, J=6.4 Hz, 2H), 1.38-1.22 (m, 8H), 0.89 (t, J=3.1 Hz, 3H). $^{13}$C NMR (100 MHz, CDCl$_3$) δ=168.75, 167.15, 151.07, 135.24, 131.88, 114.61, 112.86, 112.64, 52.45, 51.86, 43.11, 31.91, 29.20, 28.84, 27.29, 22.78, 14.20.

Synthesis of N-cycloalkyl-2-amino-terephthalate dimethyl ester (1e, 1f)

Intermediates 1e-f were synthesized via reductive amination with cyclopentanone or cyclohexanone in the presence of NaBH$_4$/TMSCl in cold DMF in high yields (Scheme 1). Under N$_2$ (g) in a 25 mL two-neck round bottom flask with a magnetic stir bar, 2-aminoterepthlate dimethyl ester (1.00 g, 4.78 mmol) was suspended in anhydrous DMF (3.2 mL) and stirred until fully dissolved. TMSCl (1.30 g, 11.95 mmol) and the corresponding cyclic ketone (5.25 mmol) were added to the solution and the mixture was cooled to 0° C. in an ice bath. NaBH$_4$ (0.18 g, 4.78 mmol) was added cautiously over 5 min. The mixture was then allowed to warm up to room temperature and monitored by TLC until disappearance of starting material. The mixture was quenched with saturated NaHCO$_3$ (aq.) followed by extraction with EtOAc (3×10 mL). The combined organic fractions were then washed with brine (3×10 mL) and dried over MgSO$_4$, filtered through celite and the solvent was removed using a rotary evaporator. The obtained crude was purified using flash chromatography (SiO$_2$, 5-10% v/v EtOAc: hexanes, dry loading).

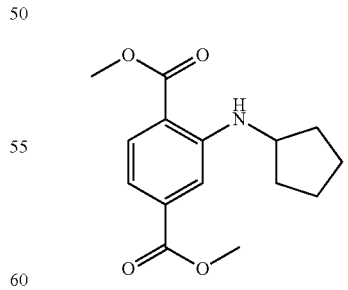

Compound 1e: Yellow liquid, yield 1.20 g (89%). $^1$H NMR (400 MHz, CDCl$_3$) δ=7.92 (d, J=8.3 Hz, 1H), 7.79 (br, NH), 7.38 (d, J=1.6 Hz, 1H), 7.15 (dd, J=8.3, 1.6 Hz, 1H), 3.95 (dd, J=9.2, 3.8 Hz, 1H), 3.91 (s, 3H), 3.86 (s, 3H), 2.14-2.00 (m, 2H), 1.81-1.71 (m, 2H), 1.72-1.62 (m, 2H), 1.57 (tdd, J=12.2, 6.2, 3.2 Hz, 2H). $^{13}$C NMR (100 MHz, CDCl$_3$) δ=168.73, 167.11, 150.55, 135.09, 131.87, 114.42, 113.41, 112.82, 53.82, 52.42, 51.81, 33.57, 24.16.

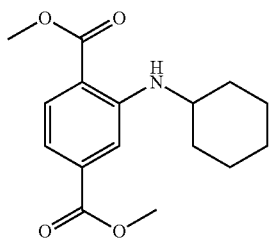 [SMILES: COC(=O)c1ccc(C(=O)OC)c(NC2CCCCC2)c1]

Compound 1f: Yellow liquid, yield 1.24 g (92%). $^1$H NMR (400 MHz, Chloroform-d) δ=7.93 (d, J=8.3 Hz, 1H), 7.81 (br, NH), 7.12 (dd, J=8.3, 1.6 Hz, 1H), 3.91 (s, 3H), 3.86 (s, 3H), 3.50 (dtd, J=12.6, 8.4, 7.9, 3.6 Hz, 1H), 2.02 (td, J=7.8, 7.3, 3.8 Hz, 2H), 1.77 (dq, J=13.0, 4.2 Hz, 2H), 1.62 (ddt, J=14.1, 9.6, 4.5 Hz, 1H), 1.51-1.22 (m, 5H). $^{13}$C NMR (101 MHz, CDCl$_3$) δ=168.79, 167.19, 150.14, 135.18, 132.08, 114.21, 113.06, 112.70, 52.45, 51.82, 50.50, 32.93, 25.96, 24.69

Synthesis of N-alkyl-2-amino-terephthalic Acid (2a-f)

The alkylated diester 1a-f (0.50 g) was dissolved in THF (25 mL), followed by addition of 1 M NaOH (aq, 12.8 mL). The solution was heated to 70° C. and stirred for 8 h. The mixture was concentrated in a rotary evaporator at 45° C. to remove the excess THF. The mixture was cooled to room temperature followed by addition of 1 M HCl (aq) until a pH=3. The observed precipitate was isolated by filtration, rinsed with water, and dried in air at room temperature for 6 h.

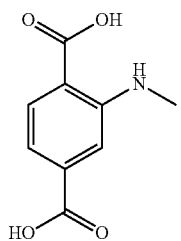

Compound 2a: Yellow solid, yield 0.46 g (92%). $^1$H NMR (400 MHz, DMSO-d$_6$) δ=7.86 (d, J=8.2 Hz, 1H), 7.21 (d, J=1.6 Hz, 1H), 7.09 (dd, J=8.2, 1.6 Hz, 1H), 2.88 (s, 3H) (FIG. 109). $^{13}$C NMR (100 MHz, DMSO-d$_6$) δ=169.37, 167.18, 151.27, 135.78, 131.85, 114.27, 113.09, 111.37, 29.20. HRMS (ESI-TOF) m/z calculated for C$_6$H$_{13}$NO$_3$ [M+H]$^+$: 196.0604, found 196.0610.

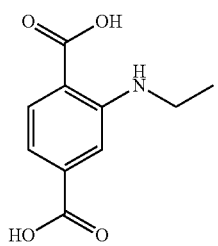

Compound 2b: Yellow solid, yield 0.45 g (90%). $^1$H NMR (400 MHz, DMSO-d$_6$) δ=7.87 (d, J=8.2 Hz, 1H), 7.23 (d, J=1.6 Hz, 1H), 7.08 (dd, J=8.2, 1.6 Hz, 1H), 3.23 (q, J=7.2 Hz, 2H), 1.23 (t, J=7.1 Hz, 3H). $^{13}$C NMR (100 MHz, DMSO-d$_6$) δ=169.46, 167.15, 150.35, 135.78, 131.96, 114.30, 112.91, 111.71, 36.70, 14.26. HRMS (ESI-TOF) m/z calculated for C$_6$H$_{13}$NO$_3$ [M+H]$^+$: 210.0761, found 210.0746.

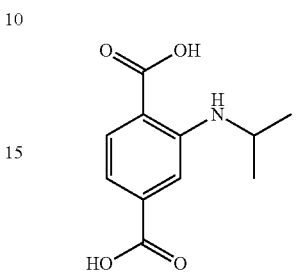

Compound 2c: Yellow solid, yield 0.47 g (94%). $^1$H NMR (400 MHz, DMSO-d$_6$) δ=7.87 (d, J=8.2 Hz, 1H), 7.25 (d, J=1.6 Hz, 1H), 7.05 (dd, J=8.2, 1.6 Hz, 1H), 3.74 (hept, J=6.4 Hz, 1H), 1.21 (d, J=6.3 Hz, 6H). $^{13}$C NMR (100 MHz, DMSO-d$_6$) δ=169.57, 167.19, 149.58, 135.75, 132.11, 114.08, 113.04, 112.14, 42.74, 22.46. HRMS (ESI-TOF) m/z calculated for C$_6$H$_{13}$NO$_3$ [M+H]$^+$: 224.0917, found 224.0924.

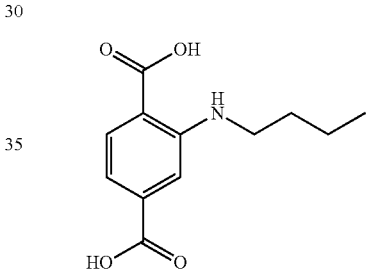

Compound 2d: Yellow solid, yield 0.48 g (96%). $^1$H NMR (400 MHz, DMSO-d$_6$) δ=7.85 (d, J=8.2 Hz, 1H), 7.24 (d, J=1.5 Hz, 1H), 7.07 (dd, J=8.2, 1.6 Hz, 1H), 3.20 (t, J=7.0 Hz, 2H), 1.60 (m, 2H), 1.40 (m, 2H), 0.93 (t, J=7.1 Hz, 3H). $^{13}$C NMR (100 MHz, DMSO-d$_6$) δ=169.52, 167.15, 150.51, 135.77, 131.96, 114.25, 112.90, 111.74, 41.72, 30.58, 19.71, 13.68. HRMS (ESI-TOF) m/z calculated for C$_6$H$_{13}$NO$_3$ [M+H]$^+$: 238.1074, found 238.1058.

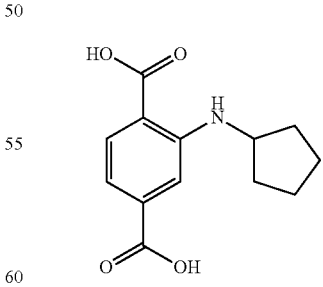

Compound 2e: Yellow solid, yield 0.47 g (93%). $^1$H NMR (400 MHz, DMSO-d$_6$) δ=7.86 (d, J=8.2 Hz, 1H), 7.27 (d, J=1.5 Hz, 1H), 7.07 (dd, J=8.2, 1.5 Hz, 1H), 3.88 (p, J=6.1 Hz, 1H), 2.02 (dq, J=12.1, 6.0, 5.1 Hz, 2H), 1.65 (dqd, J=22.4, 7.8, 3.7 Hz, 4H), 1.45 (dq, J=11.6, 5.5 Hz, 2H). $^{13}$C NMR (100 MHz, DMSO) δ=169.60, 167.21, 150.05, 135.72, 132.05, 114.28, 112.99, 112.58, 53.08, 32.92, 23.57. HRMS (ESI-TOF) m/z calculated for $C_{13}H_{16}NO_4$ [M+H]$^+$: 250.1079, found 250.1041.

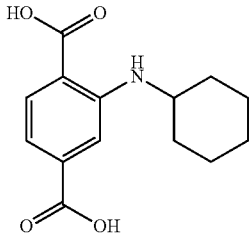 [SMILES: O=C(O)c1ccc(C(=O)O)c(NC2CCCCC2)c1]

Compound 2f: Yellow solid, yield 0.46 g (92%). $^1$H NMR (400 MHz, DMSO-d$_6$) δ=7.98 (br, NH), 7.86 (d, J=8.2 Hz, 1H), 7.25 (s, 1H), 7.04 (dd, J=8.3, 1.4 Hz, 1H), 3.45 (d, J=8.9 Hz, 2H), 1.93 (dt, J=12.6, 3.9 Hz, 2H), 1.68 (dt, J=13.3, 4.3 Hz, 2H), 1.58 (dt, J=10.0, 4.3 Hz, 1H), 1.49-1.34 (m, 2H), 1.34-1.19 (m, 3H). $^{13}$C NMR (100 MHz, DMSO) δ=169.67, 167.23, 149.54, 135.74, 132.15, 114.02, 112.11, 49.54, 32.23, 25.33, 23.97. HRMS (ESI-TOF) m/z calculated for $C_{14}H_{18}NO_4$ [M+H]$^+$: 264.1235, found 264.1189.

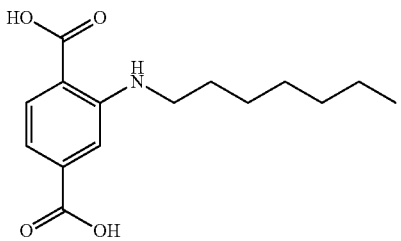 [SMILES: CCCCCCCNc1cc(C(=O)O)ccc1C(=O)O]

Compound 2g: Yellow solid, yield 0.48 g (96%). $^1$H NMR (400 MHz, DMSO-d$_6$) δ=7.86 (d, J=8.2 Hz, 1H), 7.23 (d, J=1.6 Hz, 1H), 7.07 (dd, J=8.2, 1.5 Hz, 1H), 3.19 (t, J=7.0 Hz, 2H), 1.61 (p, J=7.0 Hz, 2H), 1.44-1.20 (m, 8H), 0.92-0.80 (m, 3H)$^{13}$C NMR (100 MHz, DMSO) δ=169.54, 167.16, 150.52, 135.77, 131.97, 114.25, 112.89, 111.75, 42.02, 31.20, 28.41, 28.36, 26.45, 22.01, 13.94. HRMS (ESI-TOF) m/z calculated for $C_{15}H_{22}NO_4$ [M+H]$^+$: 280.1548, found 280.1500.

Synthesis of N,N-2-dimethyl amino-terephthlate dimethyl ester (Scheme 2)

N,N-2-dimethyl amino-terephthalic acid (2.00 g, 9.56 mmol) was suspended in anhydrous DMF (20 mL) and stirred until fully dissolved. K$_2$CO$_3$ (5.30 g, 38.2 mmol) was added, followed by dropwise addition of methyl iodide (7.66 g, 54.0 mmol), and the mixture was stirred for 18 h at 60° C. The reaction mixture was then cooled to room temperature and quenched with 2 M HCl (aq) to a pH=3. The mixture was extracted with EtOAc (3×50 mL), the combined organic extracts were washed with brine (3×50 mL), dried over anhydrous MgSO$_4$, filtered through celite and the solvent was removed using a rotary evaporator. The obtained crude was purified using flash chromatography (SiO$_2$, 15% v/v EtOAc:hexanes, dry loading).

Scheme 2: Synthesis of N,N-2-dimethyl amino-terephthalate dimethyl ester

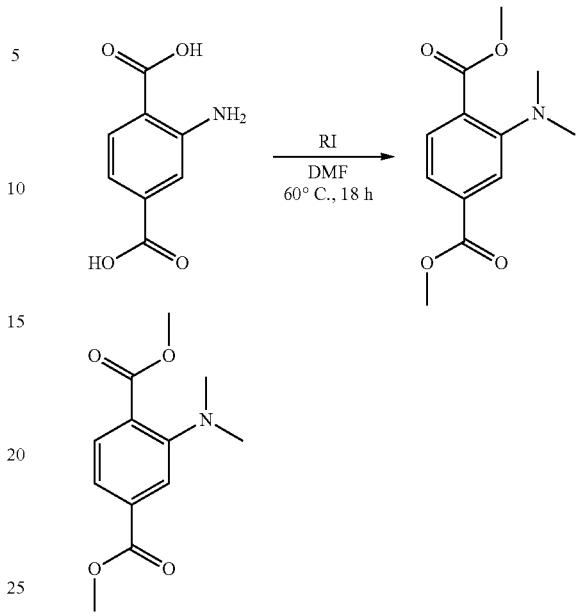

Compound S1: Yellow solid, yield 0.69 g (31%). $^1$H NMR (400 MHz, CDCl$_3$) δ=7.65 (d, J=5.9 Hz, 1H), 7.60 (s, 1H), 7.45 (d, J=7.5 Hz, 1H), 3.91 (d, J=3.8 Hz, 6H), 2.89 (d, J=3.1 Hz, 6H). $^{13}$C NMR (100 MHz, CDCl$_3$) δ=168.69, 166.90, 151.95, 133.26, 131.59, 124.43, 119.19, 117.73, 52.44, 43.57.

Synthesis of Compound 3

The alkylated diester (0.50 g) was dissolved in THF (25 mL), followed by addition of 1 M NaOH (aq, 12.8 mL). The solution was heated to 70° C. and stirred for 8 h. The mixture was concentrated in a rotary evaporator at 45° C. to remove the excess THF. The mixture was cooled to room temperature followed by addition of 1 M HCl (aq) until a pH=3. The observed precipitate was isolated by filtration, rinsed with water, and dried in air at room temperature for 6 h.

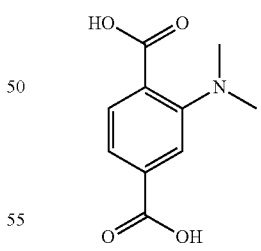

Compound 3: Yellow solid, yield 0.45 g (90%). $^1$H NMR (400 MHz, DMSO-d$_6$) δ=7.99 (d, J=1.8 Hz, 1H), 7.95-7.89 (m, 1H), 7.76-7.71 (m, 1H), 2.86 (s, 6H). $^{13}$C NMR (100 MHz, DMSO) δ=167.11, 166.43, 150.74, 134.69, 130.85, 127.29, 124.41, 120.82, 43.85.

Assembling of the Building Blocks into MOFs

General Procedure for Solvothermal MOF Crystallization in Flame-Sealed Glass Tube Vessel.

A meter-long borosilicate glass tube measuring 10×8 mm (o.d×i.d), was divided into six equal portions with a marker.

Using a glass cutter, the long tube was cut into three shorter tubes by only cutting every other mark. The cut ends of the tube were etched using an oxygen-propane torch. The final glass tubes were made by melting the intermediate glass tubes at the mark with the torch. After the reactants and solvents were loaded into to the glass tubes, a hose adaptor was used to connect the glass tube to a high vacuum (10 mtorr) using a Schlenk line constructed by fitting the open end of the tube inside a short length of standard rubber hose that was further affixed to a ground glass tap which could be closed to isolate this assembly from dynamic vacuum. The mixture was flash frozen at 77 K (liquid $N_2$), evacuated to an internal pressure of 150 mtorr (±10 mtorr), and sealed under static vacuum. Upon sealing, the length of the tube was reduced to 18-20 cm; the reactant mixture was allowed to thaw and placed in an isothermal oven inside a sand bath. After the reaction was complete, the tube was allowed to cool to room temperature, the tube was opened using a glass cutter, and the solids were isolated by filtration.

Synthesis of MIL-125-NHR

Compounds 2a-f (0.41 mmol) were placed in 20 mL scintillation vials with anhydrous DMF (4.90 mL) and anhydrous MeOH (0.35 mL). The mixture was mixed thoroughly by immersing the vial in an ultra-sonic bath for 1 min then transferred into a borosilicate glass tube and bubbled with $N_2$ (g) for 5 min. Ti(O$^i$Pr)$_4$ (0.031 mL, 0.106 mmol) was added to the tube via syringe, immediately flash frozen in liquid $N_2$, and flame sealed. The sealed tube was heated to 150° C. for 48 h. After cooling to room temperature, the formed powder was isolated by filtration and rinsed with DMF (3×) and CHCl$_3$ (3×). The powder was immersed in CHCl$_3$ and stored for 3 d in a desiccator, replacing the solvent during this time (8×). The solvent was removed by decantation and the solvent-wet powder was dried under dynamic vacuum (10 mtorr) for 48 h at room temperature. The degassed yellow solid was stored under $N_2$ in a desiccator.

MIL-125-NHMe.
Yellow solid. Yield: 0.015 g [66% yield based on $Ti_8O_{12}(C_9H_7NO_4)_6$]. FTIR (ATR, cm$^{-1}$) 3388.88, 2923.01, 1717.1, 1538.36, 1505.04, 1484.73, 1456.67, 1408.86, 1384.32, 1311.53, 1278.29, 1163.53, 1080.44, 1062.15, 1036.26, 950.04, 882.39, 768.58, 632.14, 583.12, 553.84, 507.68, 460.66

MIL-125-NHEt.
Yellow solid. Yield: 0.015 g [63% yield based on $Ti_8O_{12}(C_{10}H_9NO_4)_6$]. FTIR (ATR, cm$^{-1}$) 3364.35, 2969.06, 2927.83, 2871.17, 1622.55, 1574.24, 1538.33, 1504.43, 1480.27, 1454.32, 1385.56, 1304.75, 1279.43, 1269.21, 1157.09, 1081.55, 1058.47, 983.03, 950.64, 886.9, 768.8, 665.76, 630.17, 585.19, 512.73

MIL-125-NH$^i$Pr.
Yellow solid. Yield: 0.014 g [56% yield based on $Ti_8O_{12}(C_{11}H_{11}NO_4)_6$]. FTIR (ATR, cm$^{-1}$) 3354.94, 2965.73, 2927.26, 1622.02, 1573.66, 1538.12, 1503.89, 1454.54, 1445.82, 1410.07, 1384.84, 1279.16, 1246.65, 1117.76, 1006.2, 951.41, 888.56, 850.56, 768.24, 665.95, 636.51, 613.79, 600.93, 538.98, 482.13

MIL-125-NHBu.
Yellow solid. Yield: 0.015 g [57% yield based on $Ti_8O_{12}(C_{12}H_{13}NO_4)_6$]. FTIR (ATR, cm$^{-1}$) 3362.48, 2955.93, 2927.6, 2870.25, 1622.53, 1573.94, 1537.91, 1503.55, 1451.88, 1386.73, 1314.03, 1304.04, 1280.91, 1259.32, 1115.87, 970.85, 951.52, 906.68, 885.87, 837.9, 769.03, 731, 633.97, 616.57, 583.52, 534.70, 503.04

MIL-125-NHCyp.
Yellow solid. Yield: 0.010 g [39% yield based on $Ti_8O_{12}(C_{13}H_{13}NO_4)_6$]. FTIR (ATR, cm$^{-1}$) 3365.09, 2956.52, 2870.11, 1622.59, 1572.58, 1533.02, 1499.83, 1453.63, 1409.16, 1385.58, 1323.65, 1276.65, 1184.97, 1115.98, 1060.09, 980.45, 951.9, 886.01, 768.43, 620.1, 597.1, 523.84, 470.79

MIL-125-NHCy.
Yellow solid. Yield: 0.011 g [42% yield based on $Ti_8O_{12}(C_{14}H_{15}NO_4)_6$]. FTIR (ATR, cm$^{-1}$) 3352.11, 2927.79, 2853.15, 1620.61, 1571.39, 1532.66, 1501.01, 1453.71, 1383.93, 1322.94, 1281.56, 1248.78, 1187.03, 1150.25, 1073.88, 994.46, 959.79, 887.69, 767.44, 664.76, 631.11, 602.49, 526.78, 479.16

MIL-125-NHhept.
Yellow solid. Yield: 0.015 g [52% yield based on $Ti_8O_{12}(C_{15}H_{19}NO_4)_6$]. FTIR (ATR, cm$^{-1}$) 3373.41, 2953.73, 2926, 2854.98, 1622.82, 1573.83, 1537.73, 1532.36, 1504.52, 1454.97, 1403.36, 1385.54, 1311.73, 1278.64, 1123.5, 1063.3, 982.81, 954.74, 884.31, 768.1, 665.83, 617.89, 582.38, 548.52, 505.48

Attempts to prepare a double methylated aminoterephthalate MIL-125-NMe$_2$ using linker 3 were unsuccessful (Scheme 3) due to the decomposition of the linker into the monomethylated species 2a, with 80% conversion while forming non-porous amorphous solids. The steric constrain imposed by the double substitution can impede the crystallization of the MOF, while Ti$^{+4}$ induces N-dealkylation, similar to Zr-based MOFs, and thus only single N-alkylated MOFs were successfully synthesized.

Scheme 3. Attempted synthesis of MIL-125-NMe$_2$.

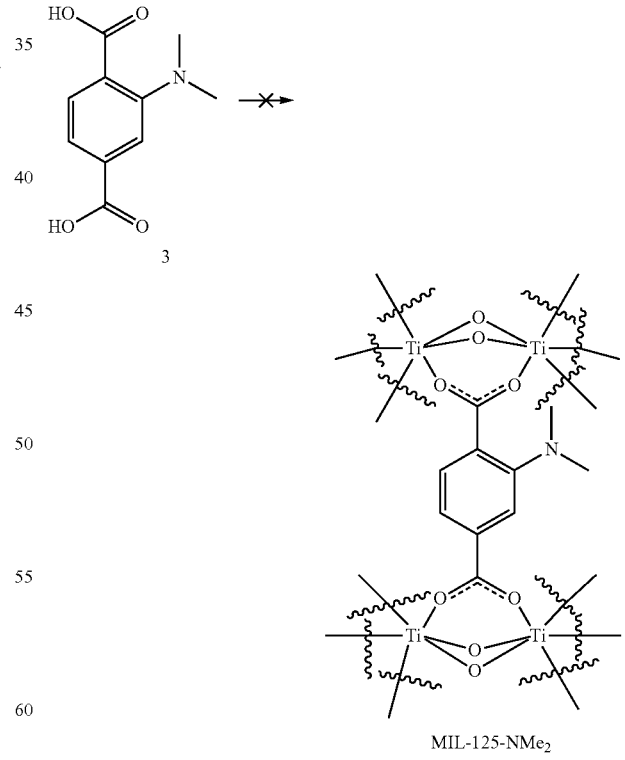

MIL-125-NMe$_2$

Note: Attempts to prepare this MOF under the same conditions as in mono N-substituted MOFs resulted in N-demethylation of the linker with formation of amorphous non-porous samples.

MOF Characterization

Activation procedure for gas adsorption. The dried MOF powder was placed in a sample tube for gas adsorption, evacuated to ~5 mtorr at room temperature and then heated up to 120° C. under dynamic vacuum for 18 h.

Blue LED photochemical reactor setup and calibration. Photocatalytic reactions were carried out in a home-built reactor using a 60 W blue LED strip (5 m long, MEILI, product #CNMX-Hardlines-464321) with λ=466 nm (fwhm=20 nm), the strip was coiled and glued inside a 20 cm diameter tin can and mounted on top of a magnetic stirrer. The temperature inside the photo reactor was kept at 25° C. with the aid of an attached fan and a thermometer. The photon flux of the photoreactor was determined by chemical actionometry though standard photoreduction of $K_3[Fe(C_2O_4)_3]$ to $Fe((C_2O_4)_2^{2-}$ at 466 nm following the protocol by Parker et al. [24]. After the preparation of a calibration curve of ferrous iron (FIG. 81), the photoreduction of $K_3[Fe(C_2O_4)_3]$ is irradiated over 360 seconds. The absorbance at 510 nm as converted to concentration of ferrous iron using the calibration curve. The emission spectrum of the blue LED photoreactor is shown in FIG. 82. The photoreduciton of $K_3[Fe(C_2O_4)_3]$ to $Fe((C_2O_4)_2^{2-}$ vs. time in blue LED reactor is shown in FIG. 83.

The radiation dose of a photoreactor using blue LED can be obtained by using the IUPAC recommended protocol by Serpone et al. [25] and the recommended quantum efficiency of 0.925 in the following equation:

$$\Phi_\lambda = \frac{R^{in}}{R_{o,\lambda}} \qquad \text{eq. (2)}$$

where $\Phi_\lambda$ is the photochemical quantum yield, $R^{in}$ is the initial rate of the photochemical reaction, and $R_{o,\lambda}$ is the incident volumetric photon flux. The obtained photon flux in the photoreactor is $R_{o,\lambda}=1.92\times10^-$ mol (photons) L$^{-1}$ h$^{-1}$.

Photochemical reduction of carbon dioxide to formate were performed under ambient conditions in the photoreactor described above. MIL-125-NHR (3-5 mg) was loaded in a 3 mL borosilicate vial with a magnetic stirrer. 1.5 mL of a $CO_2$-bubbled stock solution containing triethanolamine (TEOA, 0.30 mol L$^{-1}$) and mesitylene (1.5 mmol L$^{-1}$) in MeCN-d$_3$ was added to the vial and tightly capped with a PTFE/rubber septum. A flow of $CO_2$ (g) was bubbled into the vial with the aid of a needle with an input positive pressure of 1 psi for 30 min previous to photoirradiation. During irradiation, 40 µL aliquots were sampled every 12 h with the aid of a syringe, the aliquot was filtered through a 0.2 am PTFE syringe membrane into an NMR tube. The filtrate was diluted with CDCl$_3$ (~0.6 mL) and a total of 256 transients were measured for each time point. Kinetic plots were obtained in both concentration and turnover number in the ordinate axis. The concentration was obtained by addition of the intensity of the photoreduced-$CO_2$ signals (formate+HEF+BHEF) and normalizing with respect to the internal standard, and the turnover number was determined as the total number of moles of photoreduced-$CO_2$ (mol $CO_2$+mol HEF+mol BHEF) per mol of photocatalyst (with respect to the organic linker). The initial rate of the reaction was obtained by fitting a third order polynomial function using linear least squares then evaluating their first derivative at t=0.

Figure 12:
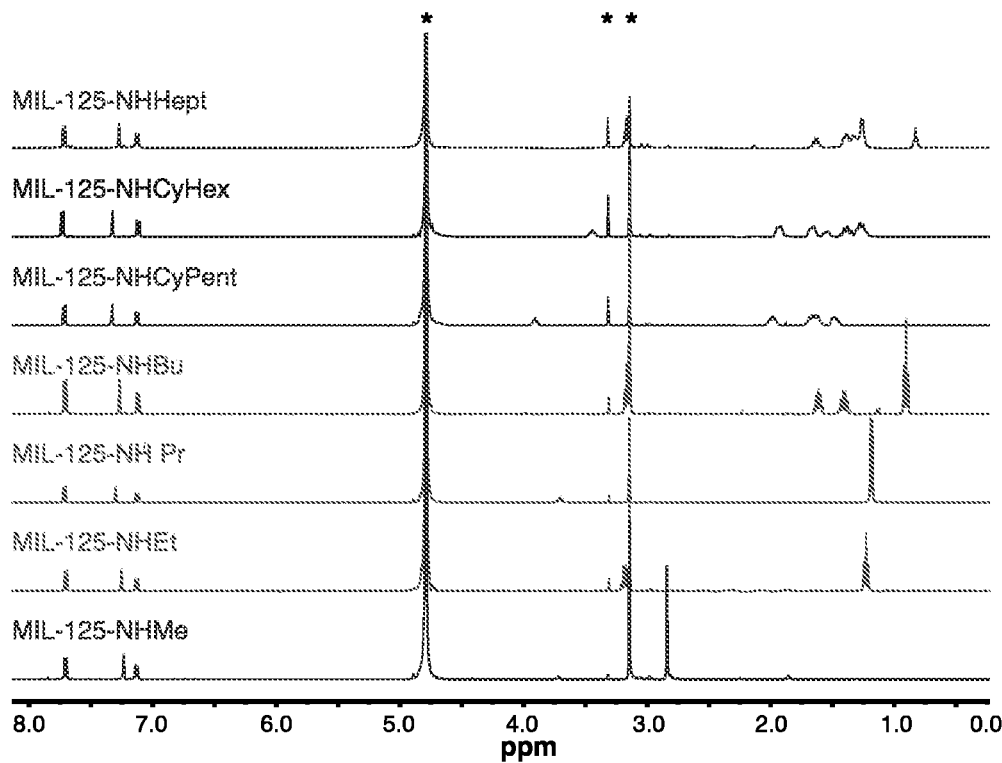
FIG. 12 is the 1H NMR spectrum (400 MHz, 0.1 M NaOD/D20, 25° C.) of NaOD/D20 digested MOFs (0.1M NaOD in D20). *=Residual solvent signals.
Figure 13:
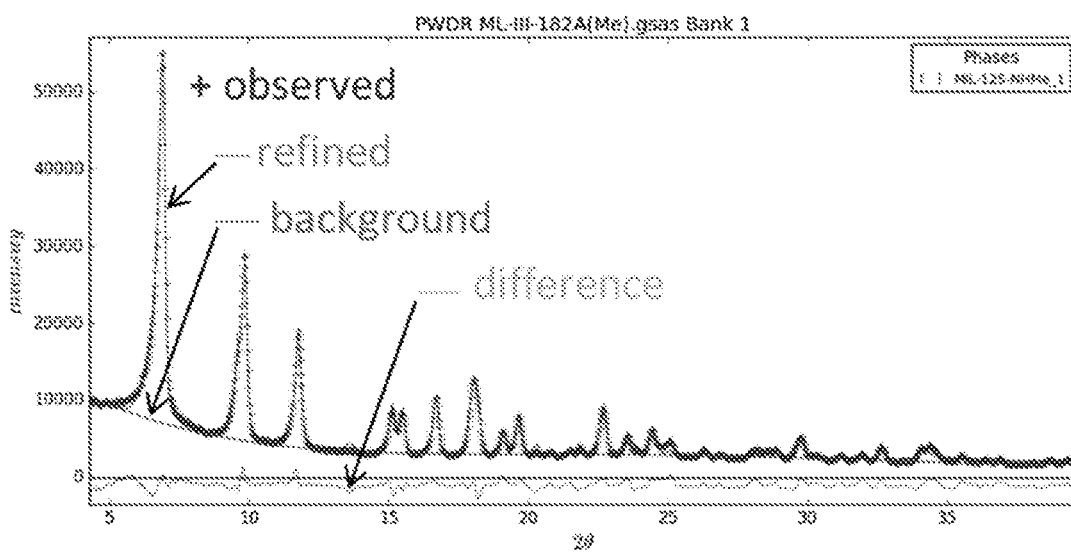
FIG. 13 is the Rietveld plot of MIL-125-NHMe.
Figure 14:
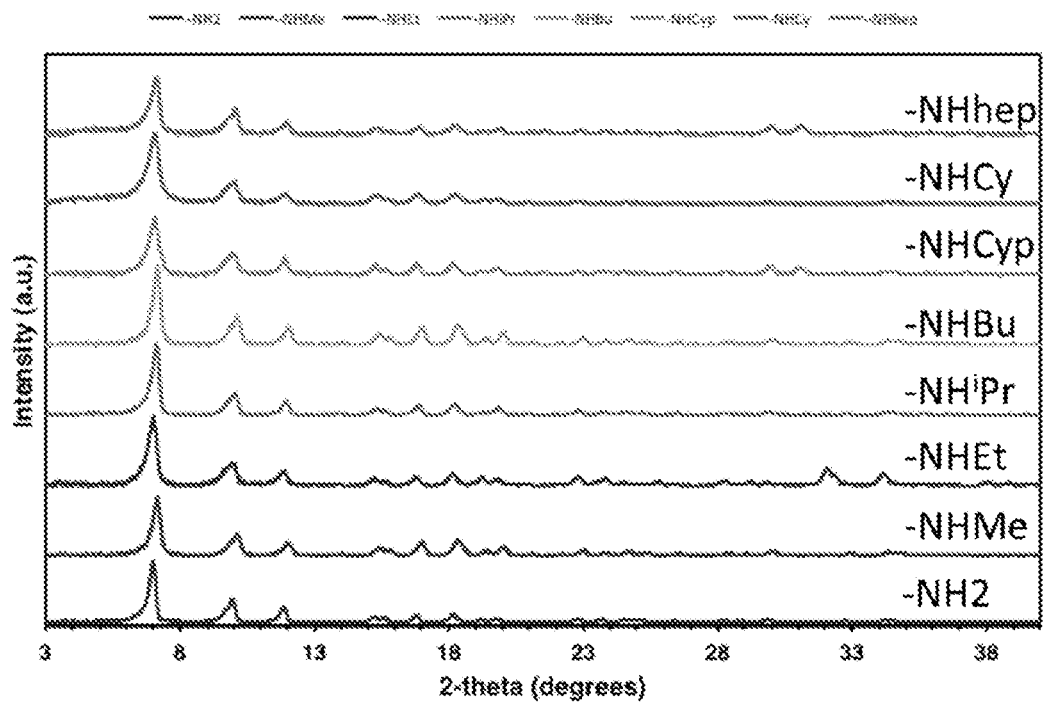
FIG. 14 is the Powder X-ray diffraction patterns of the isoreticular family of MIL-125-NHR, with R=H, Me, Et, iPr, Bu, Cyp, Cy, or hep, post photocatalysis showing no significant degradation in crystallinity.
Figure 15:
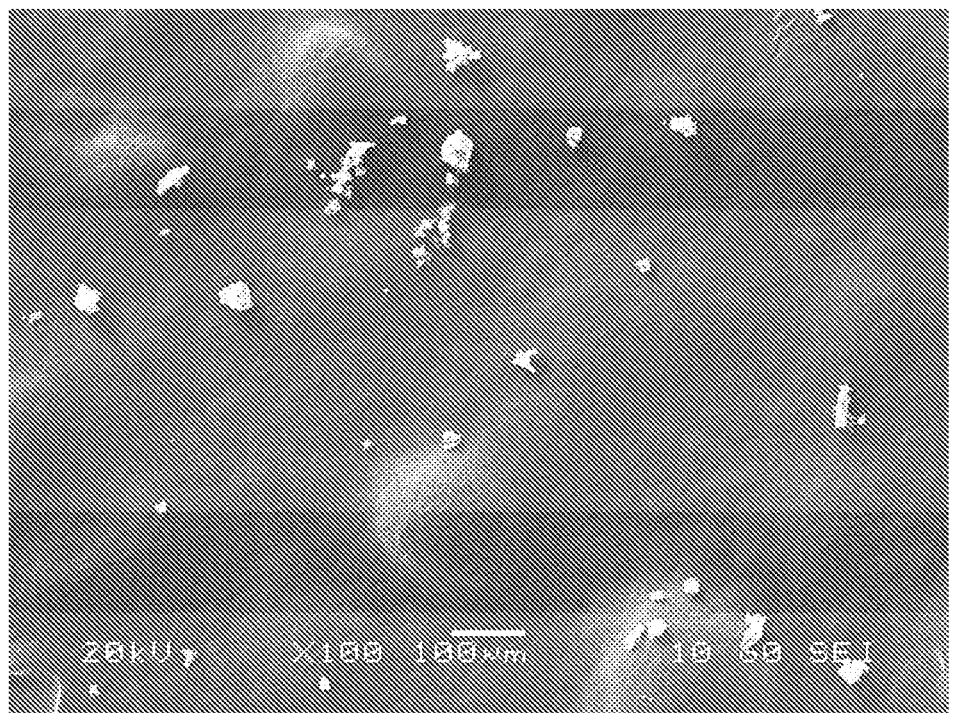
FIG. 15 is a scanning electron micrograph of MIL-125-NHMe prepared in glass vessel. Scale bar is 100 µm.
Figure 16:
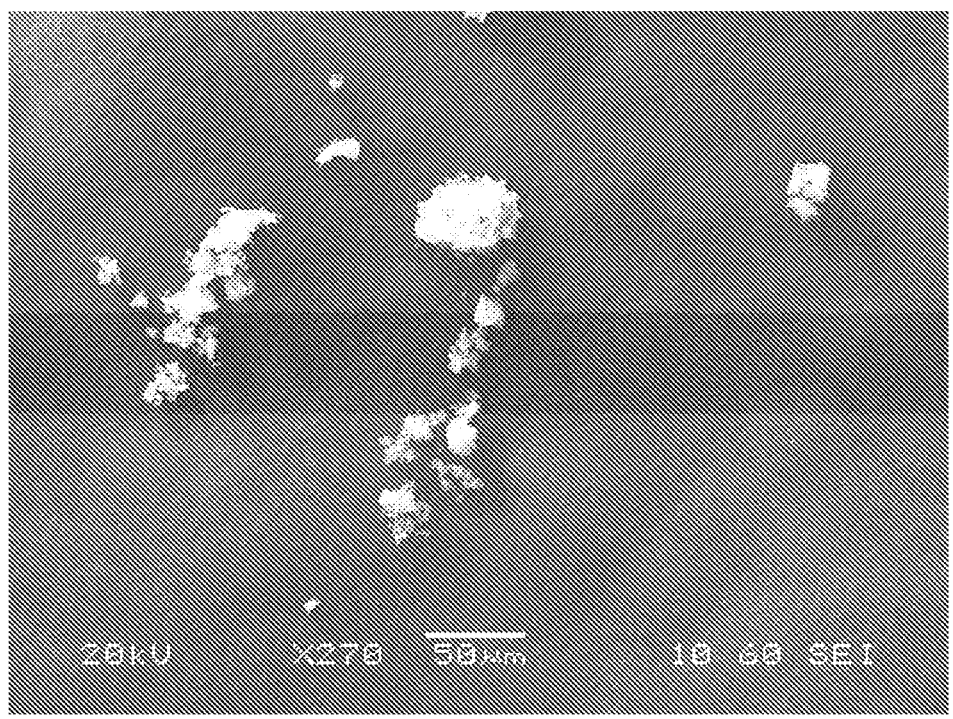
FIG. 16 is a scanning electron micrograph of MIL-125-NHMe prepared in glass vessel. Scale bar is 50 µm.
Figure 17:
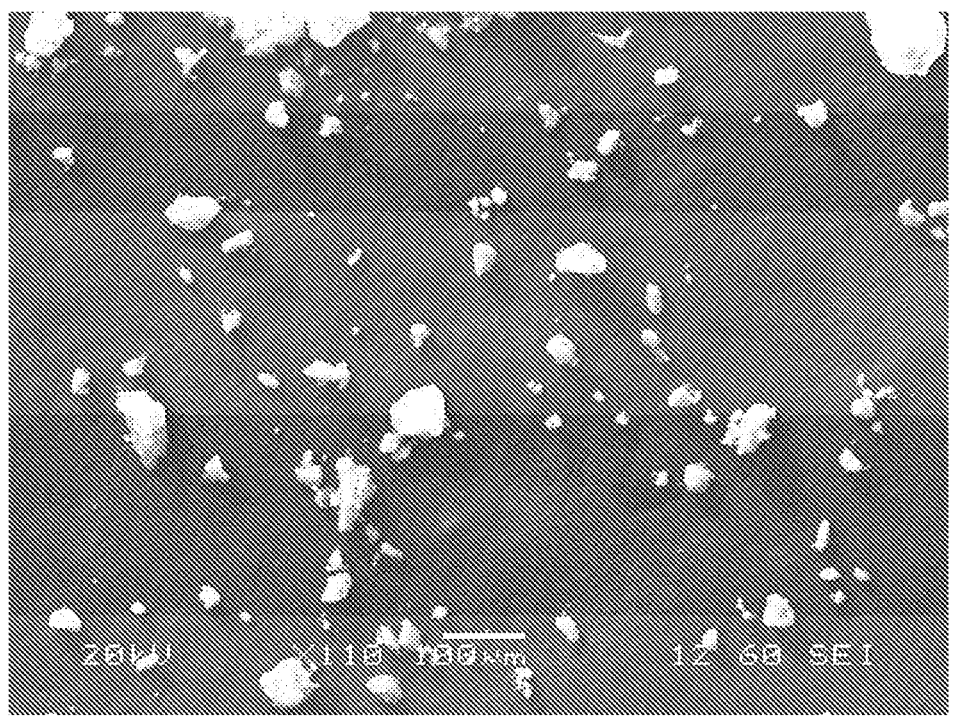
FIG. 17 is a scanning electron micrograph of MIL-125-NHEt prepared in glass vessel. Scale bar is 100 µm.
Figure 18:
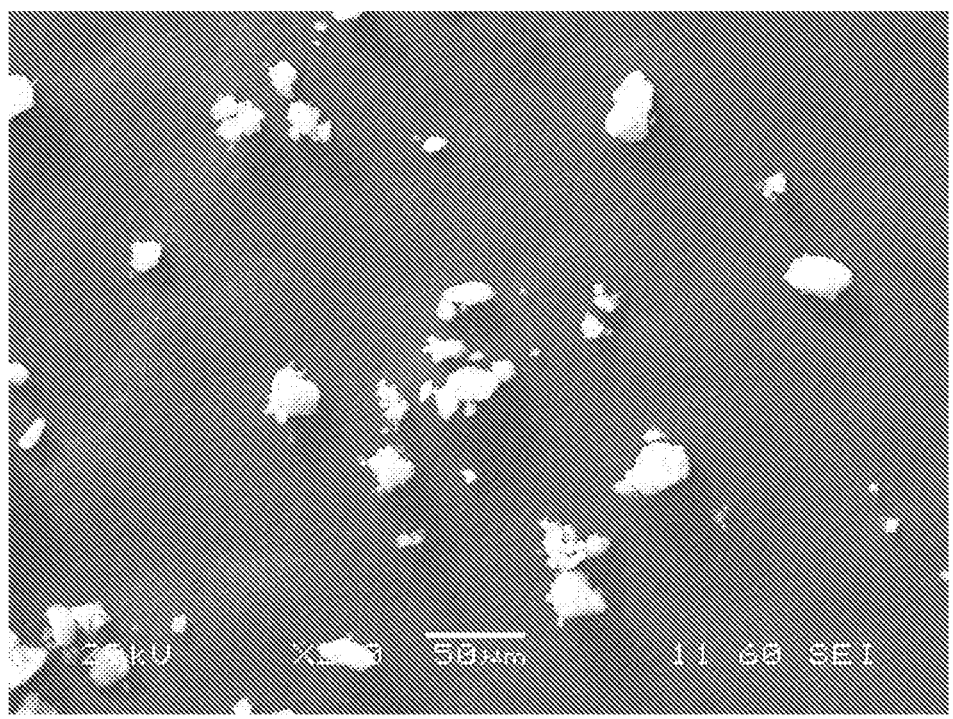
FIG. 18 is a scanning electron micrograph of MIL-125-NHEt prepared in glass vessel. Scale bar is 50 µm.
Figure 19:
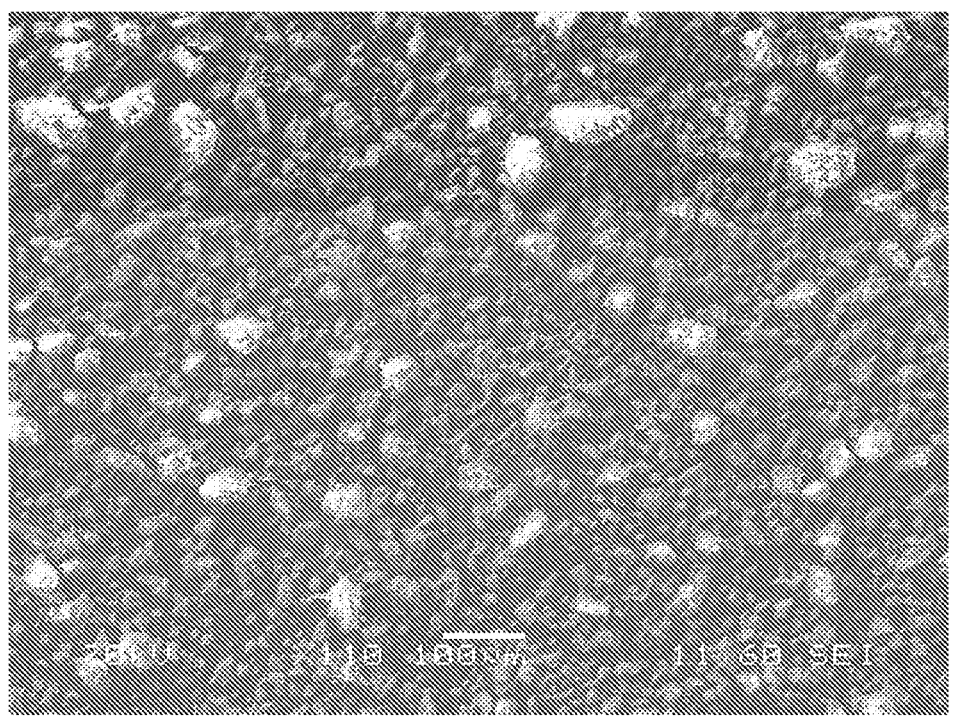
FIG. 19 is a scanning electron micrograph of MIL-125-NHiPr prepared in glass vessel. Scale bar is 100 µm.

In summary, the isoreticular family of MOFs was prepared via $S_N2$ reaction of 2-amino terephthalate dimethyl ester (Scheme 1) with the corresponding alkyl iodide in basic conditions forming intermediates 1a-d and 1g in moderate yields. Intermediates 1e-f were synthesized via reductive amination with cyclopentanone or cyclohexanone in the presence of NaBH$_4$/TMSCl in cold DMF in high yields. Hydrolysis of the dimethyl esters in NaOH/THF afforded linkers 2a-g, and solvothermal MOF crystallization with Ti(O$^i$Pr)$_4$ in DMF/MeOH in flame sealed borosilicate tubes produced the desired MOFs in high yields. The molecular integrity of the linkers within the MOFs was determined using $^1$H NMR by dissolving the synthesized MOFs in NaOD 0.1 M in D$_2$O (FIG. 12). These measurements allowed identifying any loss of alkyl chains at the N-substitution, as it has been observed by others [26] that solvothermal conditions using tetravalent early transition metal ions (such as Zr$^{+4}$) in DMF can induce dealkylations at the N-substitution. No loss of N-alkyl chains was observed in any of the prepared MOFs, indicating a robust and clean crystallization.

Figure 2:
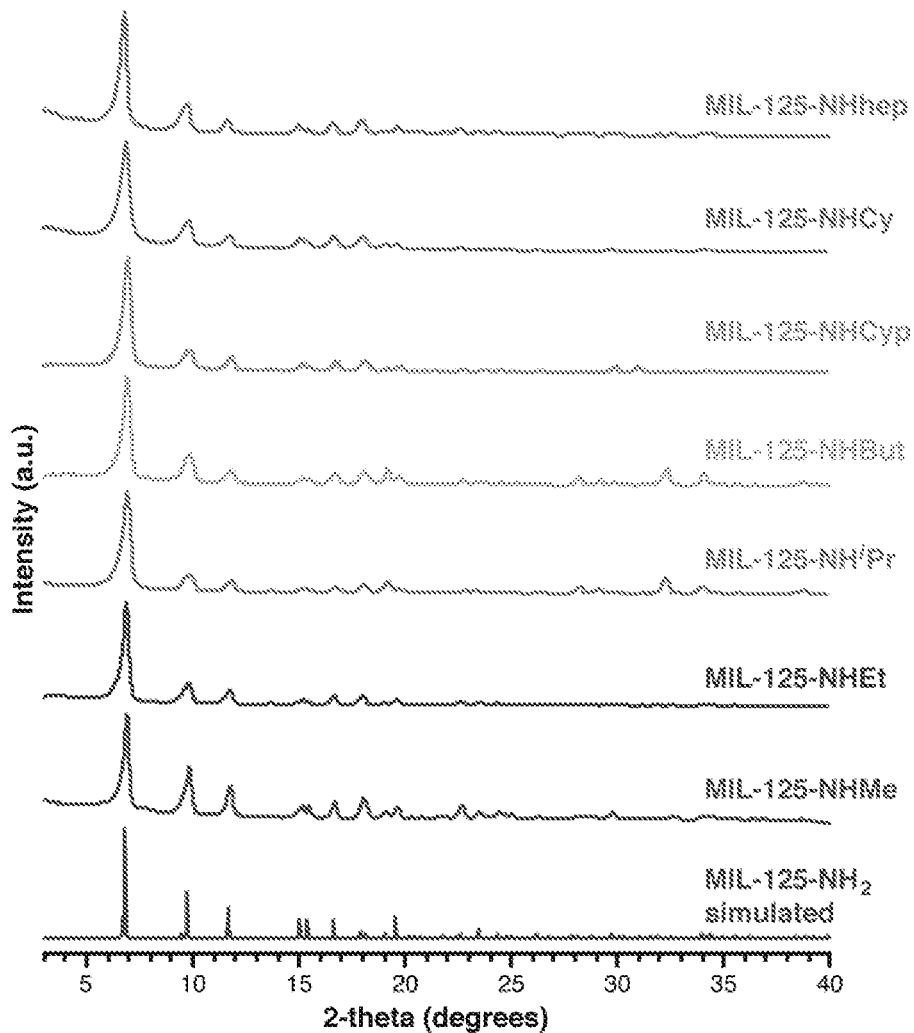
FIG. 2 is the Powder X-ray diffraction patterns of the isoreticular family of MIL-125-NHR compared to the simulated pattern of the parent MIL-125-NH2.

The MOFs were obtained as microcrystalline powders that were analyzed by scanning electron microscopy (SEM) and powder X-ray diffraction (PXRD) crystallography. SEM images (FIG. 21-FIG. 28) displayed samples with uniform particle shape and texture, suggesting homogeneous materials. All the materials display sharp diffraction peaks (FIG. 2) starting at 6.8° 2θ, evidencing a high degree of crystallinity with large unit cells, as expected in a MOF. All patterns were indexed by comparison to the simulated pattern of MIL-125-NH$_2$, [17] suggesting the formation of frameworks that are isoreticular to MIL-125. Crystal simulation using Materials Studio Modeling Suite [21] produced the library of suitable models for crystal structure solution with the Rietveld method. Refinements of the experimental patterns vs. the theoretical crystals allowed the solution of the crystal structures in the high symmetry tetragonal I4/mmm space group with low residuals, where the —NR groups were assumed to be disordered around the four possible positions in the terephthalate ring and inside the pore.

Figure 23:
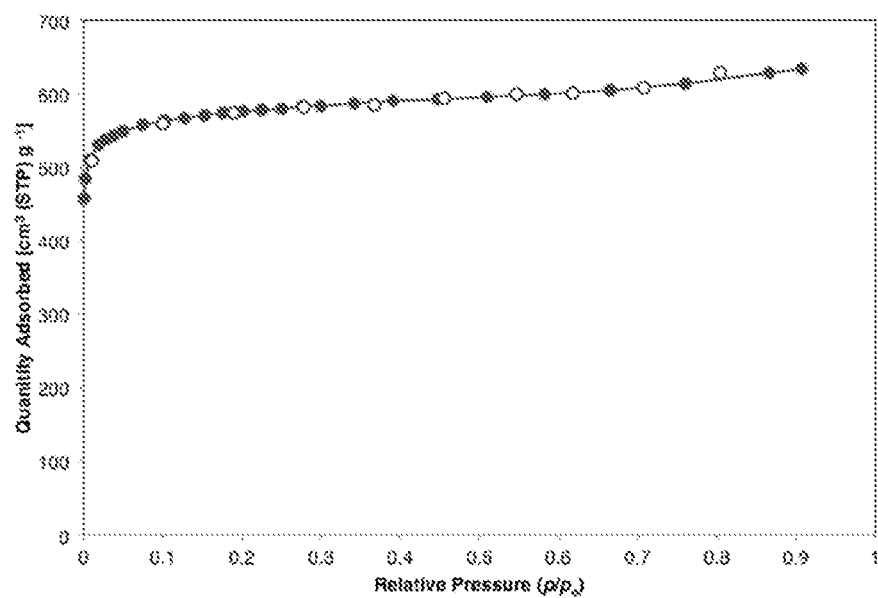
FIG. 23 is the nitrogen gas adsorption isotherm (77 K) of MIL-125-NH2.
Figure 24:
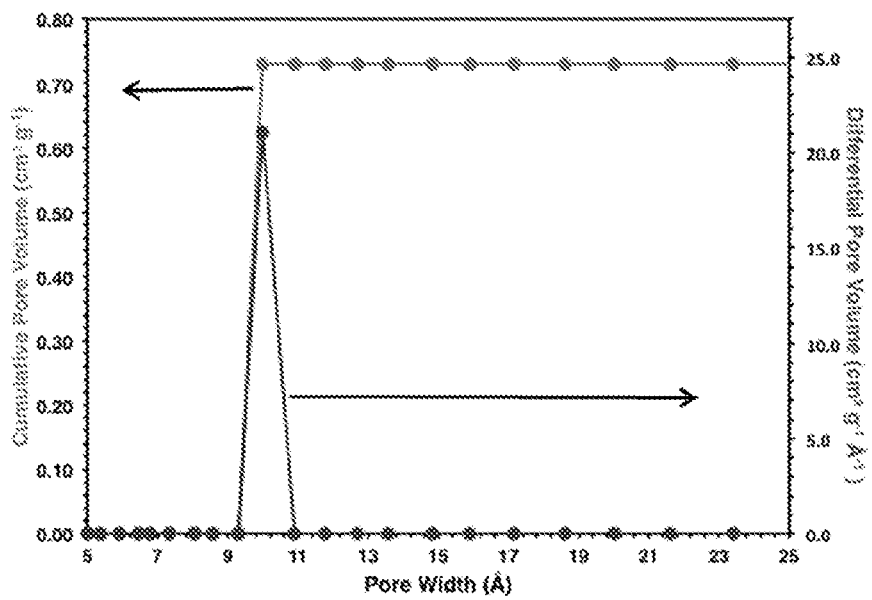
FIG. 24 is the NLDFT pore size distribution of MIL-125-NH2 using data measured from N2 gas isotherm at 77 K.
Figure 25:
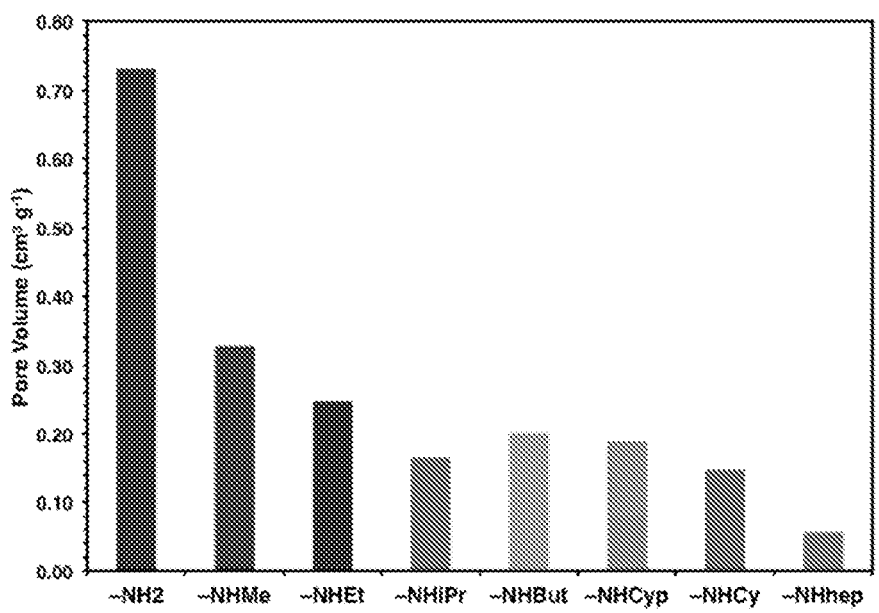
FIG. 25 is the pore volume of as prepared MOFs calculated from NLDFT using data measured from N2 gas isotherm at 77 K
Figure 26:
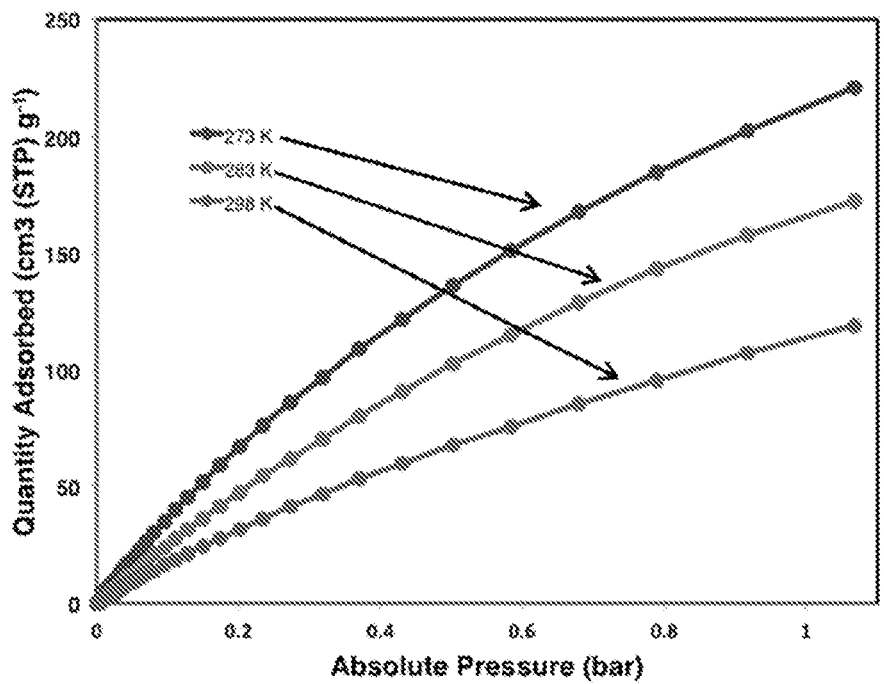
FIG. 26 is the CO2 gas adsorption isotherm of MIL-125-NH2 at 273 K, 283 K, and 298 K.
Figure 27:
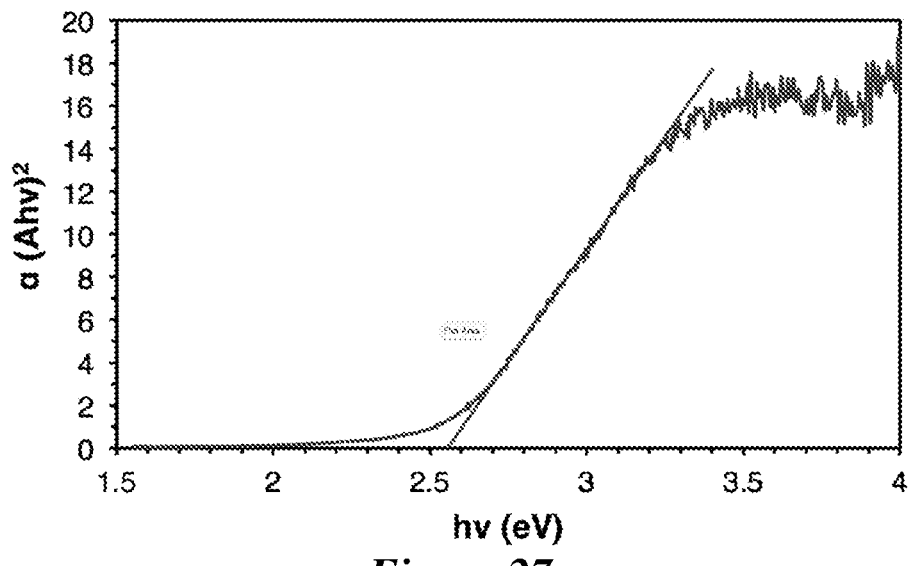
FIG. 27 is the Tauc plot for MIL-125-NH2. Linear region is indicated.
Figure 28:
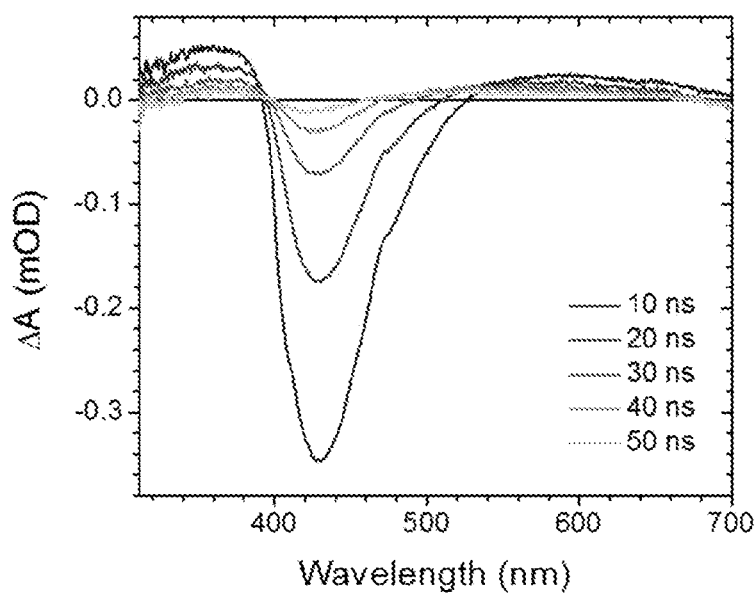
FIG. 28 is the transient absorption spectra for MIL-125-NH2, suspended in MeCN ($\lambda$ex=405 nm).
Figure 29:
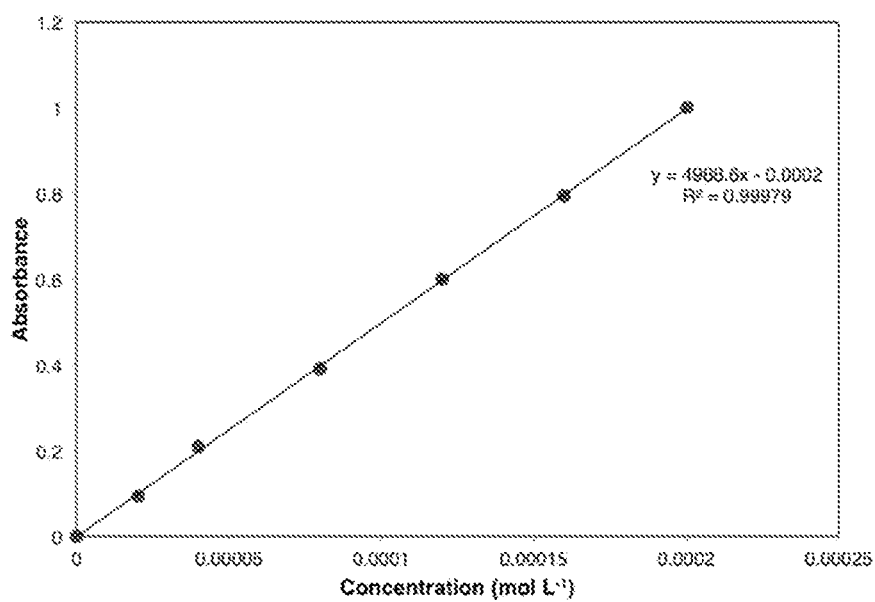
FIG. 29 is the calibration curve showing the concentration of Fe(II) vs. absorbance at 510 nm. Plotted with linear regression line and R2 value.
Figure 30:
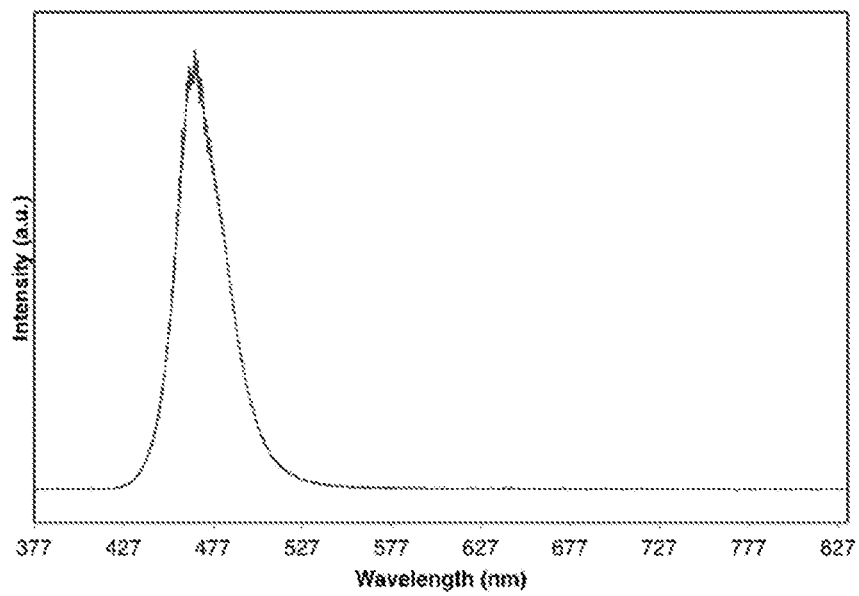
FIG. 30 is the emission spectrum of blue LED photoreactor.
Figure 31:
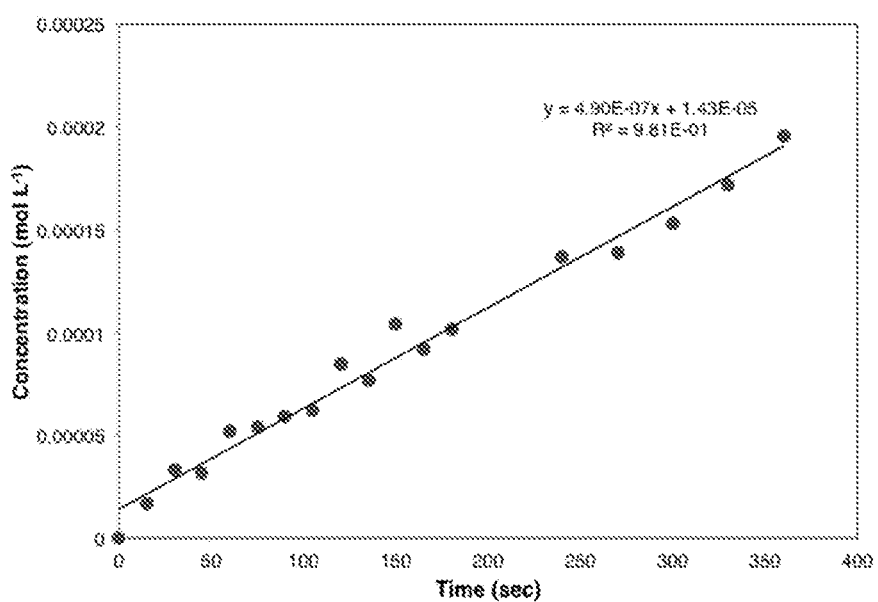
FIG. 31 is the photoreduciton of K3[Fe(C2O4)3] to Fe((C2O4)22- vs. time in blue LED reactor. Plotted with linear regression line and R2 value.

The porosity of the MOFs was determined using N$_2$ gas adsorption at 77 K. All isotherms display IUPAC Type II isotherm behavior that corresponds to microporous materials with fully reversible adsorption behavior FIGS. 23 and 24 are exemplary data for the first member of the homologous series, MIL-124-NH2. Application of the Brunauer-Emmet-Teller (BET) model in the low-pressure region of the isotherm resulted in BET surface areas between 200 and 1000 m$^2$ g$^{-1}$. The N$_2$ BET surface area parameters are summarized in Table 4-Table 5. A progressive decrease is observed in the order of MIL-125-NH$_2$ ($S_{BET}$=1,200 m$^2$ g$^{-1}$)>MIL-125-NHMe ($S_{BET}$=1,000 m$^2$ g$^{-1}$)>MIL-125-NHEt ($S_{BET}$=750 m$^2$ g$^{-1}$)>MIL-125-NHBu ($S_{BET}$=690 m$^2$ g$^{-1}$)>MIL-125-NHCyp ($S_{BET}$=580 m$^2$ g$^{-1}$)>MIL-125-NH$^i$Pr ($S_{BET}$=490 m$^2$ g$^{-1}$)>MIL-125-NHCy ($S_{BET}$=420 m$^2$ g$^{-1}$)>MIL-125-NHhep ($S_{BET}$=230 m$^2$ g$^{-1}$).

TABLE 4

N$_2$ BET Surface area parameters.

| MIL-125-NHR | Me | Et | Tr | Bu |
|---|---|---|---|---|
| $V_m$(cm$^3$(STP) g$^{-1}$) | 229.64 | 173.09 | 112.86 | 158.38 |
| $\sigma_{V\_m}$ | 0.62 | 0.42 | 0.28 | 0.61 |
| $S_{BET}$ (m$^2$ g$^{-1}$) | 998.9 | 752.9 | 491.0 | 689.0 |
| $\sigma_{S\_BET}$ | 2.7 | 1.8 | 1.2 | 2.6 |
| $C_{BET}$ | 3382 | 3663 | 2800 | 2159 |
| $\sigma_{C\_BET}$ | 640 | 676 | 521 | 481 |

TABLE 5

N$_2$ BET Surface area parameters.

| MIL-125-NHR | Cyp | Cy | hep |
|---|---|---|---|
| $V_m$(cm$^3$(STP) g$^{-1}$) | 134.41 | 96.37 | 53.79 |
| $\sigma_{V\_m}$ | 0.44 | 0.46 | 0.35 |
| $S_{BET}$ (m$^2$ g$^{-1}$) | 584.7 | 419.2 | 234.0 |
| $\sigma_{S\_BET}$ | 1.9 | 2.0 | 1.5 |
| $C_{BET}$ | 2424 | 1262 | 822 |
| $\sigma_{C\_BET}$ | 505 | 274 | 205 |

Figure 3:
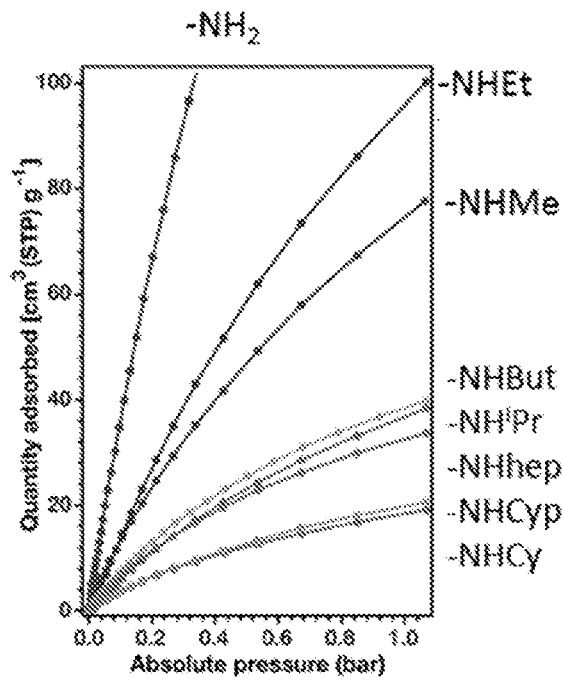
FIG. 3 is the CO2 gas adsorption isotherms (273 K) of MIL-125-NHR with R=H, Me, Et, iPr, Bu, Cyp, Cy, or hep.
Figure 4:
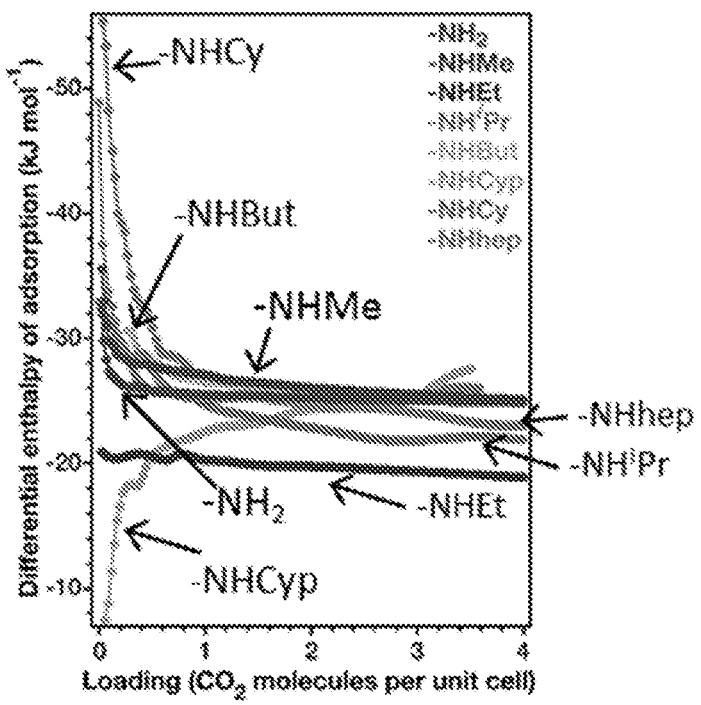
FIG. 4 is the Differential (or isosteric) enthalpy of adsorption vs. loading plots of MIL-125-NHR with R=H, Me, Et, iPr, Bu, Cyp, Cy, or hep.

The total cumulative pore volume, obtained from non-local density functional theory (NLDFT) fitting of the N$_2$ isotherms, resulted in a decreasing pore volumes consistent with increased substitution (FIG. 59) decreasing from 0.73 cm$^3$ (STP) g$^{-1}$ in MIL-125-NH$_2$ to 0.09 cm$^3$ (STP) g$^{-1}$ in MIL-125-NHhep. The CO$_2$ adsorption isotherms at 273 K (FIG. 3), 283 K, and 298 K (FIG. 60-FIG. 67) exhibit a similar trend in uptake where increased N-alkyl substitution results in lower uptakes from 221 cm$^3$ g$^{-1}$ in MIL-125-NH$_2$, to 19.1 cm$^3$ g$^{-1}$ in MIL-125-NHhep. These trends are consistent with: 1) increased amount of weight of the MOF by addition of extra atoms in the N-alkyl chain, and 2) the decreased accessibility to the pores as a result of clogging of the pore and pore apertures as the alkyl chains occupy free space of the pores. Although the functionalized MOFs display lower CO$_2$ uptakes than the parent MIL-125-NH$_2$ at room temperature (especially MIL-125-NHCyp, MIL-125-NHCy, and MIL-125-NHhep), their adsorption capacity has little effect in their CO$_2$ photoreduction rates (see below), which only suggests that mass transport within the pores is not the rate determining step in the photoreduction. Determination of the differential enthalpy of adsorption $\Delta\dot{h}_{ads}$ (FIG. 4) allows understanding the thermodynamic interactions between CO$_2$ and the MOFs. No particular trend in the differential enthalpy of adsorption $\Delta\dot{h}_{ads}$ was observed by the systematic N-alkyl substitution across the uptake ranges, with all MOFs observing similar $\Delta\dot{h}_{ads}$ than MIL-125-NH$_2$, ranging from −20 kJ mol$^{-1}$ (MIL-125-NHEt) to −27 kJ mol$^{-1}$ (MIL-125-NHMe) when loading 1 CO$_2$ molecule per unit cell. This lack on trend in adsorption enthalpy evidences the convoluted effect of: 1) the inherent porosity of the parent MIL-125 framework, 2) the electron rich nature of the amino nitrogen lone pair acting as a Lewis basic site, and 3) the steric hindrance imposed by the bulky alkyl substituents. While the enthalpy of adsorption is a combination of all these effects, the undiluted electronic effects are better understood by determination of the bandgap of the MOFs.

Figure 5:
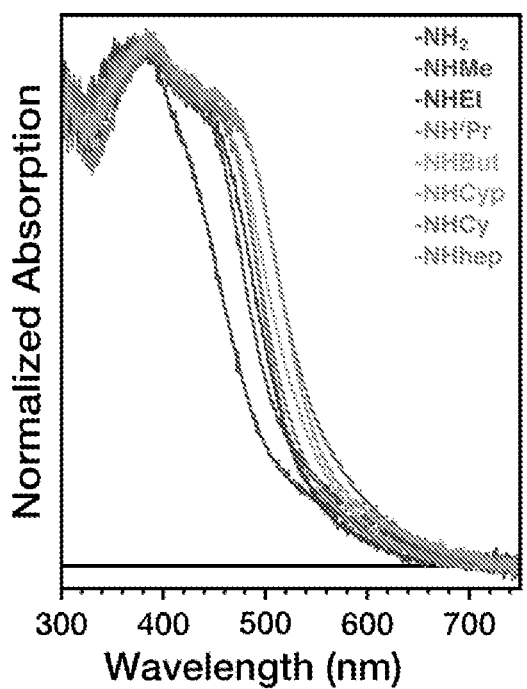
FIG. 5 is the Solid-state absorption spectra of MIL-125-NHR MOFs with R=H, Me, Et, iPr, Bu, Cyp, Cy, or hep.
Figure 6:
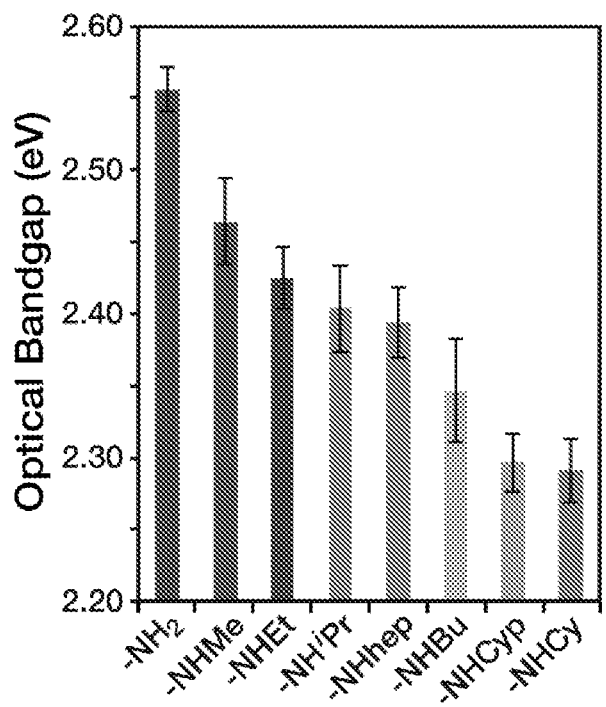
FIG. 6 is the measured bandgap for MIL-125-NHR MOFs, with R=H, Me, Et, iPr, Bu, Cyp, Cy, or hep., using the Tauc model (error bands correspond to one standard deviation from the linear fitting.

The UV-visible absorption spectra for crystalline powder of the MIL-125-NHR series were acquired using an integrating sphere and the results can be seen in FIG. 5. The parent MIL-125-NH$_2$ exhibits a low energy absorption peak at 375 nm. A gradual redshift in the absorption is observed for the alkylated derivatives; the shift can be attributed to the alkyl donor group destabilizing the top of the valence band (HOMO) of the amino terephthalate linker. Application of the Tauc model to the photoabsorption plots (e.g., FIG. 27) allowed for the determination of the optical bandgap (or HOMO-LUMO gap). The optical bandgap of the prepare MOFs is summarized in Table 6. A decrease in the bandgap of the materials is observed (FIG. 6) from MIL-125-NH$_2$ ($E_g$=2.56 eV) to MIL-125-NHCy ($E_g$=2.29 eV) in a stepwise mode with increased alkyl chain substitution, as expected from the inductive effects of the corresponding alkyl chain. Of the series, the n-heptyl substituted MOF displayed a larger bandgap than the cyclopentyl and cyclohexyl, and close in value to n-butyl substituted MOF. This behavior is due to the linear nature of the heptyl chain. Inductive effects decrease exponentially as the C—C σ-bonds are further away from the heteroatom, expecting very little induction beyond the fourth σ-bond, as observed in MIL-125-NHBu and MIL-125-NHhep. In contrast, cyclic substituents retain the σ-bonds in close proximity to the amine group, resulting in stronger electronic induction and therefore lower bandgaps. Tertiary carbon substitutions (e.g., tert-butyl), or N,N-dialkyls (e.g. MIL-125-NMe$_2$) can result in even lower bandgaps.

TABLE 6

Optical bandgap of the prepared MOFs.

| MIL425-NHR | $E_g$ (eV) | Std. Dev. (eV) |
|---|---|---|
| —NH$_2$ | 2.56 | 0.02 |
| —NHMe | 2.46 | 0.03 |
| —NHEt | 2.42 | 0.02 |
| —NH$^i$Pr | 2.40 | 0.03 |
| —NHBu | 2.35 | 0.04 |
| —NHCyp | 2.30 | 0.02 |
| —NHCy | 2.29 | 0.02 |
| —NHhep | 2.39 | 0.02 |

Figure 7:
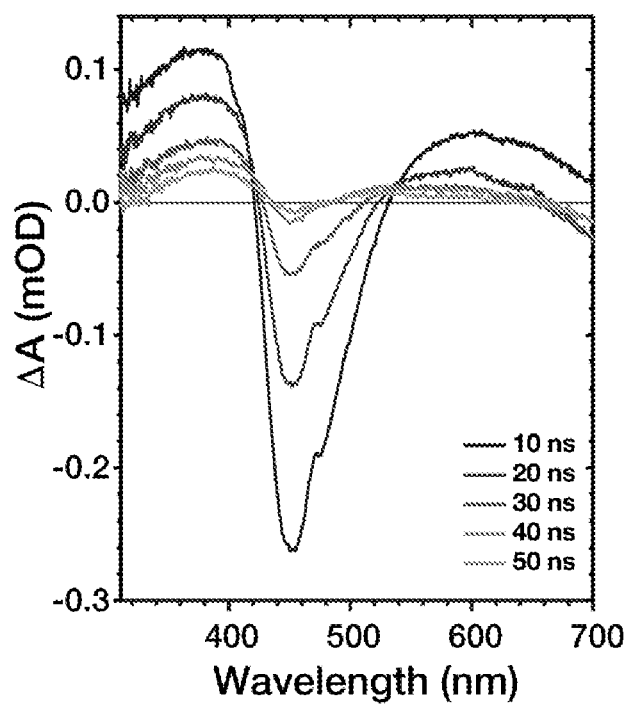
FIG. 7 is the transient absorption spectra for MIL-125-NHMe.
Figure 8:
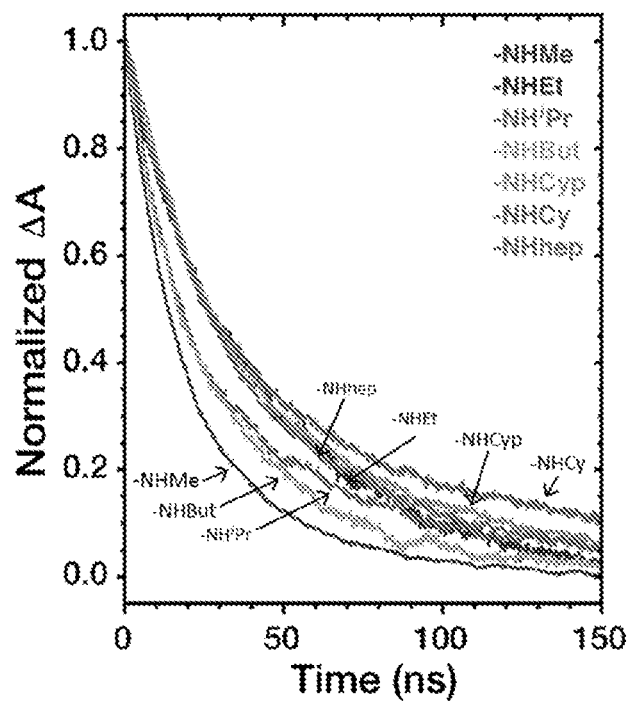
FIG. 8 is the time-resolved absorption traces at 500 nm for MIL-125-NHR, with R=H, Me, Et, iPr, Bu, Cyp, Cy, or hep., suspended in MeCN ($\lambda$ex=405 nm).

The photocatalytic rates and efficiencies of MIL-125-NHR MOFs can be dependent on the lifetime of the photo generated charge-separated state [18]. To gain insights into the excited state dynamics, nanosecond transient absorption spectroscopy was performed on suspensions of selected MIL-125-NHR in MeCN and the results can be seen in FIG. 7. Upon excitation at 405 nm the parent material, MIL-125-NH$_2$, exhibits bleach from 390 nm to 530 nm and positive $\Delta A$ features at $\lambda$<390 nm and $\lambda$>530 nm (FIG. 76). These transient spectroscopic features are indicative of the charge-separated state with a hole on the amino terephthalate linker and the electron on the titanium-oxo cluster [18, 27]. As was observed with the ground state absorption, the alkylated complexes $\Delta A$ features are red shifted by ~30 nm compared to MIL-125-NH$_2$. The lifetime of the charge-separated state for the measured set of MIL-125-NHR materials was monitored at 500 nm ($\lambda_{ex}$=405 nm) and the results can be seen in FIG. 8. The lack of signal rise time indicates that the charge-separated state is generated within the instrument response time (<10 ns). The lifetime constants from the time-resolved absorption spectra of the prepared MOFs are summarized in Table 7. The charge-separated lifetime increases in the order of MIL-125-NH$_2$ ($\tau$=12.8 ns)<MIL-125-NHMe ($\tau$=38.2 ns)<MIL-125-NHBu ($\tau$=52.1 ns)<MIL-125-NHEt ($\tau$=60.63 ns)<MIL-125-NHCyp (i=68.9 ns)<MIL-125-NHCyp (i=68.8 ns)<MIL-125-NHhep ($\tau$=69.2 ns)<MIL-125-NH$^i$Pr ($\tau$=75.11 ns)<MIL-125-NHCy ($\tau$=91.35 ns) generally corresponding to a trend of longer lifetimes with greater donor ability of the alkyl substituent. The enhanced stabilization of the oxidized terephthalate by the secondary alkyl chain can be responsible for the long lifetime observed for MIL-125-NH$^i$Pr.

TABLE 7

Lifetime constant from time-resolved absorption spectra of the prepared MOFs.

| MIL-125-NHR | $\tau$ (ns) |
|---|---|
| —NH$_2$ | 12.77 |
| —NHMe | 38.19 |
| —NHEt | 60.63 |

TABLE 7-continued

Lifetime constant from time-resolved absorption spectra of the prepared MOFs.

| MIL-125-NHR | τ (ns) |
|---|---|
| —NH$^i$Pr | 75.11 |
| —NHBu | 52.13 |
| —NHCyp | 68.88 |
| —NHCy | 91.35 |
| —NHhep | 69.17 |

Figure 9:
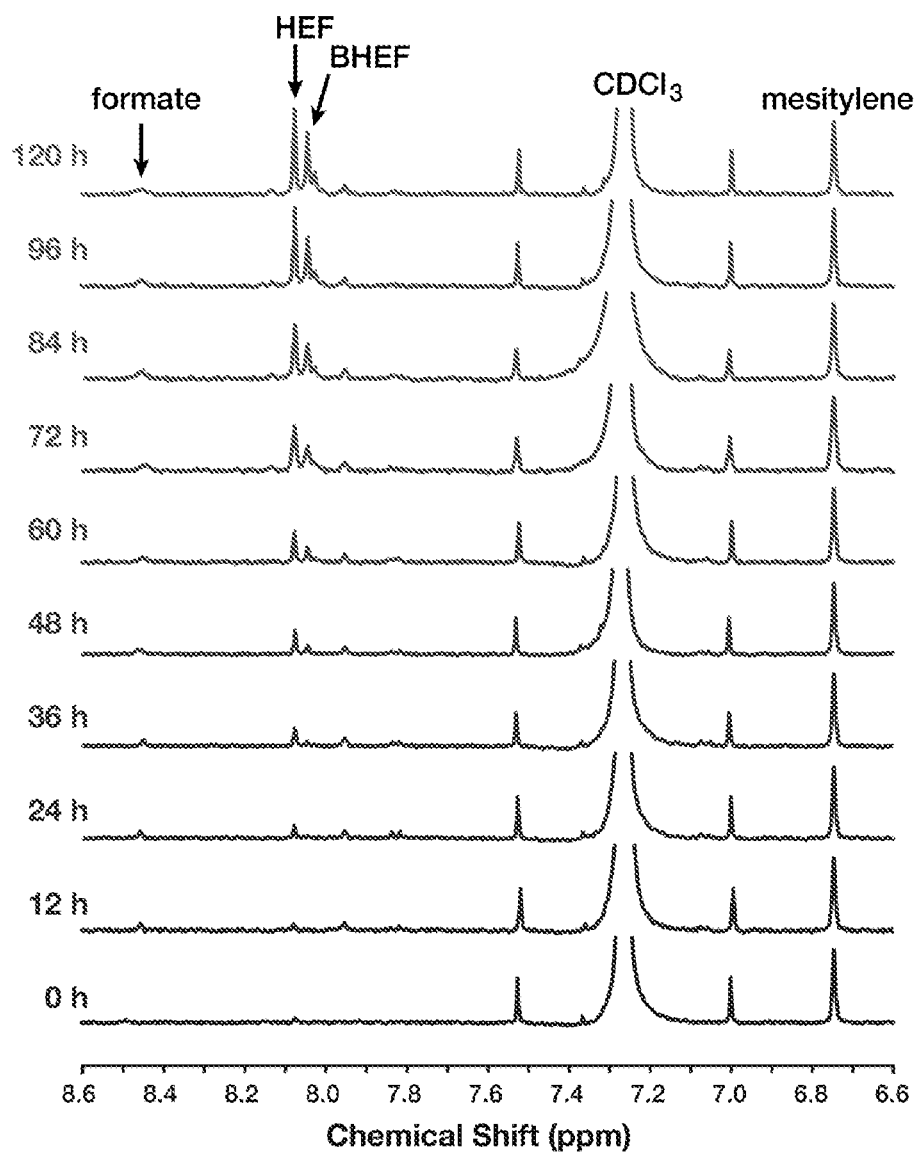
FIG. 9 is the 1H NMR traces (400 MHz, CDCl3, 25° C.) at varying times of the photoreduction of CO2 under blue LED illumination using MIL-125-NHCyp. Signals for formate, HEF, BHEF, residual solvent, and internal standard are indicated.
Figure 10:
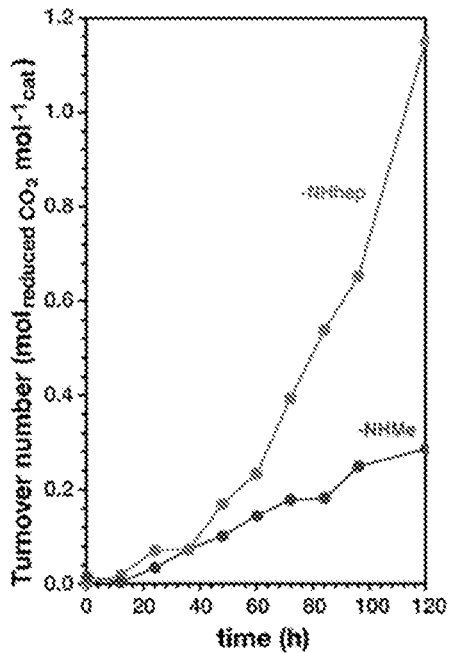
FIG. 10 is the kinetic plot of CO2-photoreduced products (formate, HEF and BHEF) over time utilizing MIL-125-NHMe and MIL-125-NHhep. Turnover number determined as total moles of reduced CO2 per mole of catalyst (based on linker).
Figure 11:
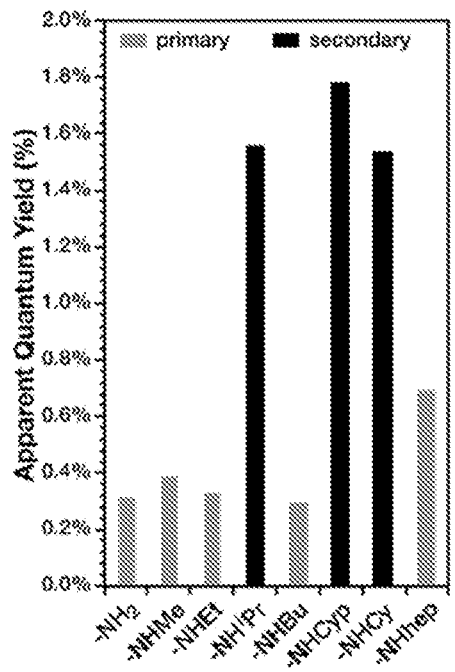
FIG. 11 is the CO2 photoreduction apparent quantum yield of the isoreticular MIL-125-NHR MOFs, with R=H, Me, Et, iPr, Bu, Cyp, Cy, or hep. The histogram color indicates the nature of the alkyl chain.
Figure 32:
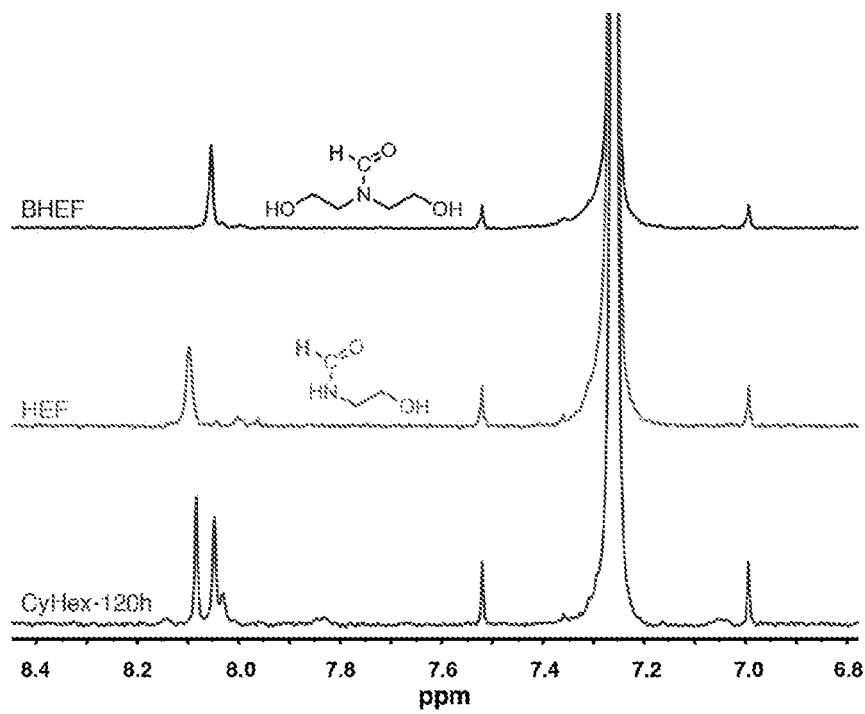
FIG. 32 is the 1H NMR (CDCl3, 400 MHz, 25° C.) of HEF and BHEF compared to CO2-photoreduced products using MIL-125-NHCy. Signal at 7.26 ppm is residual solvent and it corresponding satellite peaks.
Figure 33:
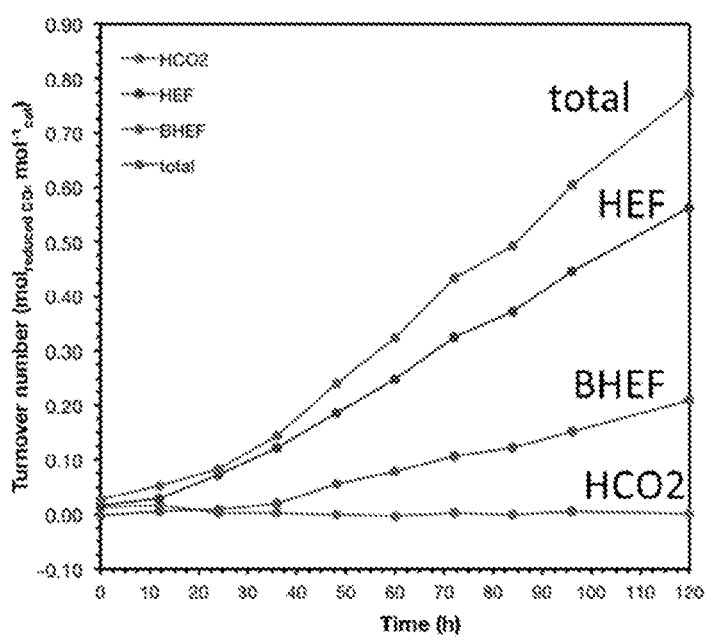
FIG. 33 is the kinetic plot of CO2-photoreduced products using MIL-125-NH2.
Figure 34:
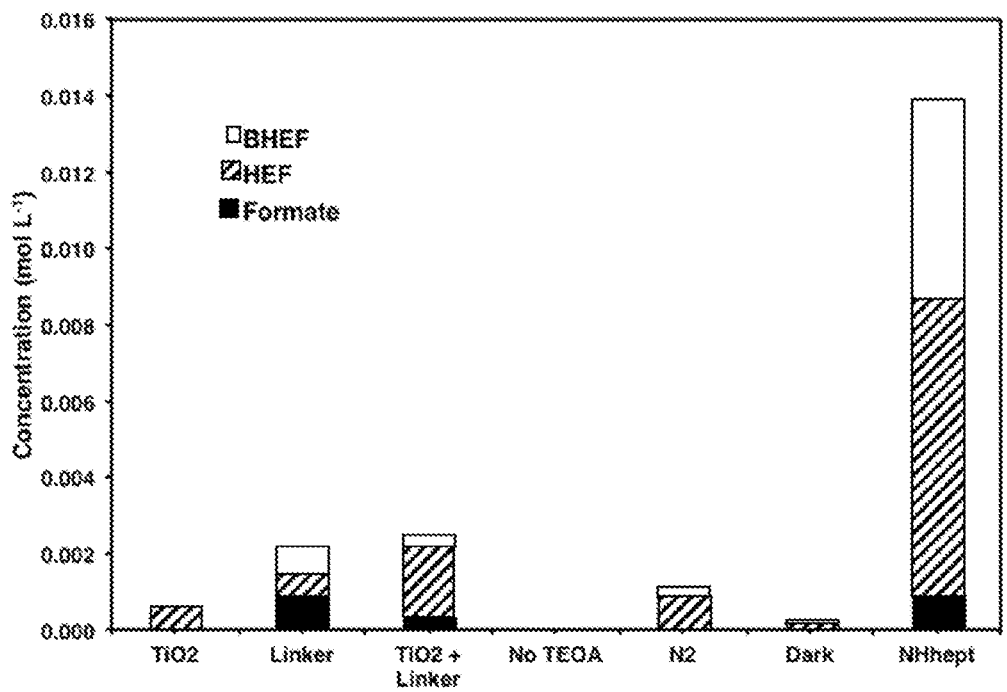
FIG. 34 is the control experiments at 120 h blue LED exposure showing the concentration in mol L−1, compared to MIL-125-NHhept MOF.
Figure 35:
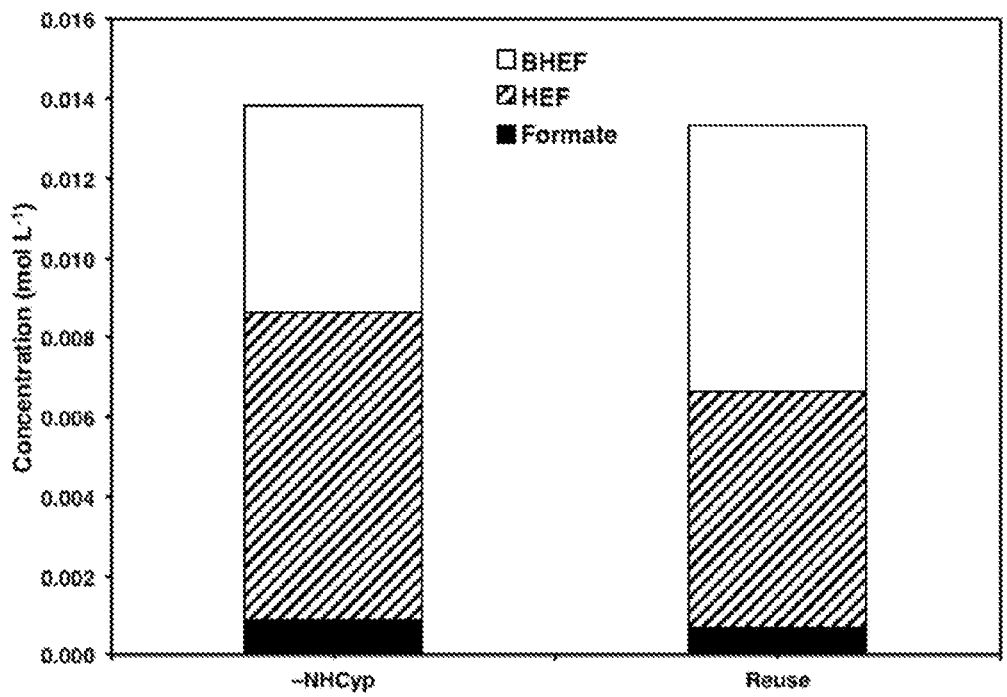
FIG. 35 is a plot showing the concentration in mol L−1 of CO2 reduced species from re-utilized MIL-125-NHCyp after an additional 120 h exposure under blue LED compared to the pristine MOF photocatalyst.

The photocatalytic activity of the isoreticular MOFs towards $CO_2$ photoreduction using blue irradiation (Scheme 4) was examined. A LED light source was utilized because of its accessibility, low cost, high irradiance, low power needs and narrow emission profile, compared to Xe-based lamps [28]. Moreover, using a narrow band aids in circumventing photocatalysis by any residual titanium oxide formed during the MOF synthesis, as these phases require light in the UV region (λ<350 nm) [3]. Irradiating MIL-125-NHR suspensions in MeCN-$d_3$ under a flow of $CO_2$ and in the presence of triethanolamine, TEOA (a reducing agent), and mesitylene (an internal standard) with blue light (λ=466 nm) resulted in the formation of formate as the product of $CO_2$ reduction, which displays a $^1$H NMR signal at 8.45 ppm (FIG. 9). Two other signals were also observed at 8.08 and 8.04 ppm, which correspond to N-(2-hydroxyethyl)formamide (HEF) and N,N-bis(2-hydroxyethyl)formamide (BHEF), respectively (FIG. 32). These two species appear as result of formate reacting with the hydrolyzed products of oxidized TEOA (Scheme 4), as the photoreduction operates in non-anhydrous conditions [29]. Integration of the NMR signals and normalization with respect to the mesitylene internal standard provided kinetic plots (FIG. 33) for the three $CO_2$-photoreduced species. FIG. 10 displays the kinetic plot of the total $CO_2$-reduced products over 120 h utilizing MIL-125-NHMe and MIL-125-NHhep. Similar to the trend in photoabsoption and bandgap, the increased number of carbon atoms in the N-alkyl chain results in increased photocatalytic activity, with turnover numbers at 120 h between 0.284 for MIL-125-NHMe and 1.151 for MIL-125-NHhep. For comparison purposes, the concentration of formate was measured with the photoreactor ([formate]=0.165 mmol L$^{-1}$ at t=12 h) and compared to the observations of Li et al. ([formate]=0.136 mmol L$^{-1}$ at t=10 h) [17], resulting in very similar values, providing a validation to the approach used herein (FIG. 93). Fitting polynomial functions to the concentration-based kinetic plot, followed by evaluation at t=0 h of their first derivative, allowed the initial rate of the photoreduction to be obtained (Table 8). The initial rates for all the MOFs were utilized to obtain an apparent quantum yield ($\Phi_{app}$, also referred as photonic efficiency [25]) using eq. (2) (Table 8). In this work, the term apparent quantum yield is used for two reasons: first, the ratio of light absorption/scattering by the MOF is not accounted for (i.e. assume complete light absorption is assumed), and second, because the kinetic plot accounts for two side reactions (amide formation) that occur after the photocatalytic step. As shown in FIG. 11, secondary N-alkyls, isopropyl, cyclopentyl, and cyclohexyl (FIG. 11 black histograms) display a larger $\Phi_{app}$ (1.5-1.8%) than the primary N-alkyls (0.30-0.40%, FIG. 11 grey histograms); especially MIL-125-NHCyp, which displayed the largest apparent quantum yield $\Phi_{app}$=1.80%. The increased catalytic activity is consistent with the increased excited-state lifetime and decreased bandgap for the secondary alkyl substituent species.

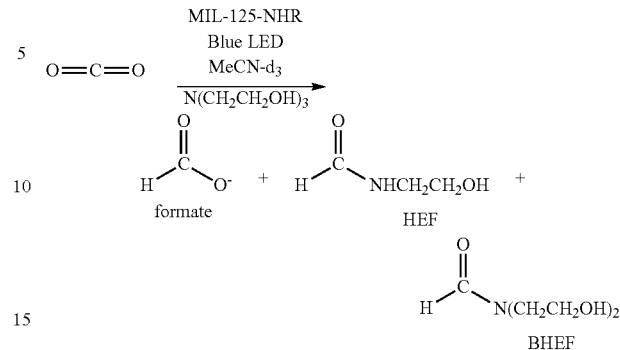

Scheme 4. Photocatalytic reduction of carbon dioxide.

Note: HEF and BHEF appear as formate reacts with hydrolyzed products of oxidized triethanolamine [29].

TABLE 8

Initial rate of reaction and apparent quantum yield. Initial rate of reaction obtained from evaluation at t = 0 of the first derivative of the 3$^{rd}$ order polynomial fit. Apparent quantum yield obtained according to eq. (2).

| MIL-125-NHR | $R^{in}$ (mol L$^{-1}$ h$^{-1}$) | Apparent quantum yield ($\Phi_{app}$) |
|---|---|---|
| MIL-125-NH$_2$ | 5.97 × 10$^{-6}$ | 0.31% |
| MIL-125-NHMe | 7.52 × 10$^{-6}$ | 0.39% |
| MIL-125-NHEt | 6.42 × 10$^{-6}$ | 0.33% |
| MIL-125-NH$^i$Pr | 3.00 × 10$^{-5}$ | 1.56% |
| MIL-125-NHBu | 5.71 × 10$^{-6}$ | 0.30% |
| MIL-125-NHCyp | 3.41 × 10$^{-5}$ | 1.78% |
| MIL-125-NHCy | 2.95 × 10$^{-5}$ | 1.54% |
| MIL-125-NHhep | 1.33 × 10$^{-5}$ | 0.69% |

Figure 20:
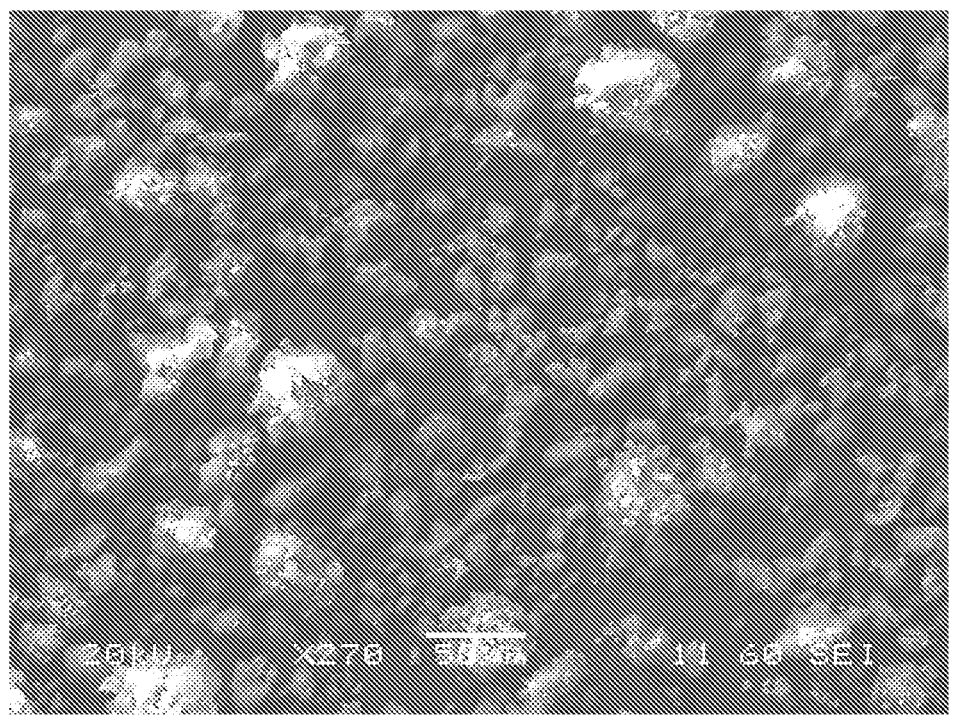
FIG. 20 is a scanning electron micrograph of MIL-125-NHiPr prepared in glass vessel. Scale bar is 50 µm.
Figure 21:
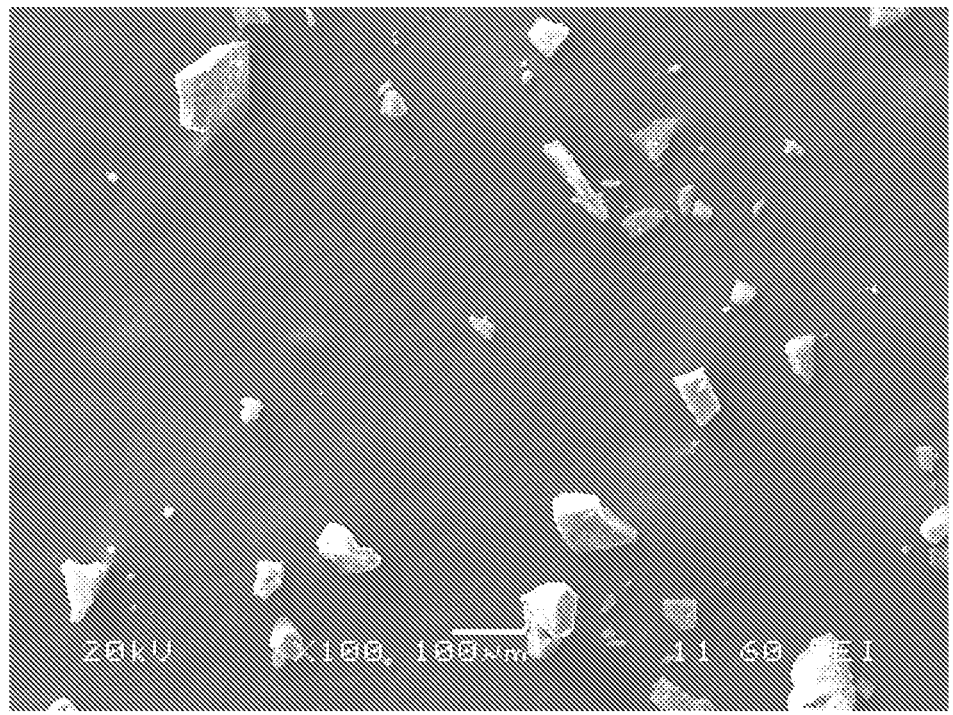
FIG. 21 is a scanning electron micrograph of MIL-125-NHBu prepared in glass vessel. Scale bar is 100 µm.
Figure 22:
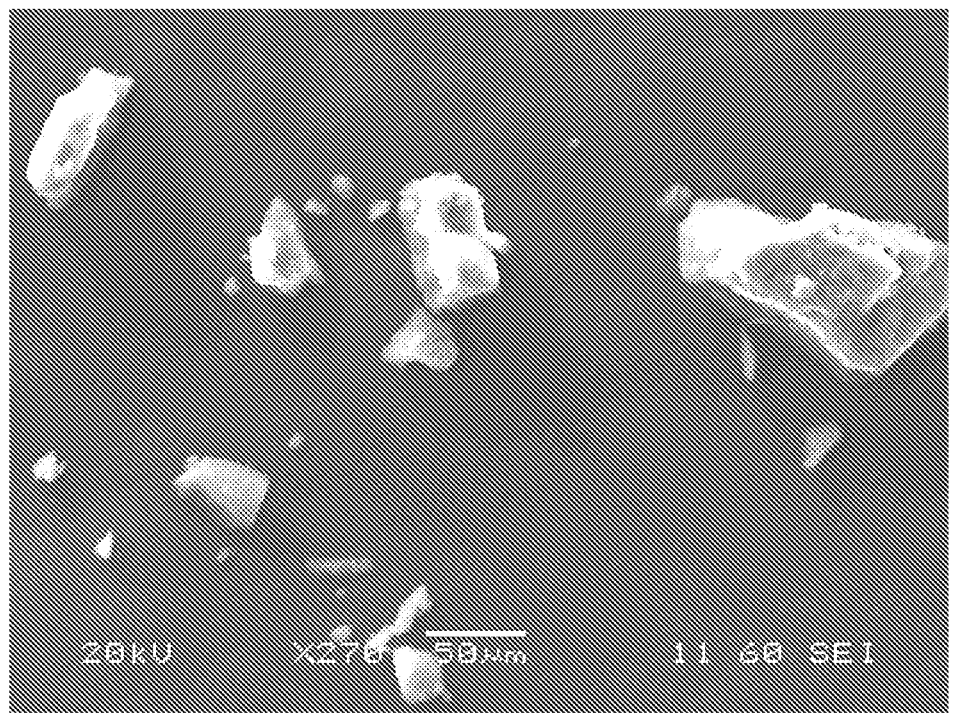
FIG. 22 is a scanning electron micrograph of MIL-125-NHBu prepared in glass vessel. Scale bar is 50 µm.

No trend or correlation was observed between the photocatalytic rates/efficiency and the gas adsorption properties of the MOFs. Electronic effects from N-alkyl substitution can determine the photocatalytic efficiency with little effect from mass transport. This assessment is consistent with the reaction mechanism proposed by Fu et al. [17], who propose that upon photoexcitation, an electron is promoted from the π-cloud in terephthalate to a Ti d-state and is further transferred to $CO_2$, reducing it to formate. The MOF catalyst is then regenerated by oxidizing TEOA (the latter also serving as proton source). The observed correlation between excited-state lifetime and apparent quantum yield herein suggest that the rate-limiting step of the reduction is the electron transfer from Ti$^{+3}$ to $CO_2$. The chemical stability of the MIL-125-NHR MOFs was assessed by PXRD and $^1$H NMR after 120 h of photoreaction. No changes in the PXRD patterns were observed, suggesting stability of the crystalline framework (FIG. 20). Moreover, only marginal linker decomposition was observed in the $^1$H NMR spectra of the base-digested MOFs. The reusability of the MOF photocatalysts was assessed by re-exposing MIL-125-NHCyp for a second photocatalytic run for another 120 h, observing less than 5% variation in concentration of reduced $CO_2$ species, indicating photochemical stability after reuse (FIG. 94).

An isoreticular series of titanium-based MOF photocatalysts were prepared by increasing the N-alkyl substitution in MIL-125-NHR, where R varies from methyl, to ethyl, isopropyl, n-butyl, cyclopentyl, cyclohexyl, and n-heptyl. The isoreticular nature of their crystal structure was studied by powder X-ray crystallography and gas adsorption. Their photophysical and photocatalytic properties were studied displaying a gradual decrease in the optical bandgap from 2.56 eV in MIL-125-NH$_2$ to 2.29 eV in MIL-125-NHCy, consistent with increased electron density around the organic linker via inductive effects of the N-alkyl chain. The photocatalytic efficiency of the MOFs towards reduction of carbon dioxide under blue LED light was explored, displaying increased reaction rates and quantum yields consistent with the increased alkyl substitution. The CO$_2$ photoreduction quantum yield is higher for MOFs with increased excited-state lifetime, particularly with secondary N-alkyls substituents, and it was concluded that from the current proposed mechanism, the electron transfer from Ti$^{+3}$ to CO$_2$ can be the rate-limiting step in the photoreduction. The results herein indicate that small variations in the organic linker of the MOF can result in tuning of the photophysical and photocatalytic properties of the materials, solely by selection of specific substituents in the organic links.

Other advantages which are obvious and which are inherent to the invention will be evident to one skilled in the art. It will be understood that certain features and sub-combinations are of utility and may be employed without reference to other features and sub-combinations. This is contemplated by and is within the scope of the claims. Since many possible embodiments may be made of the invention without departing from the scope thereof, it is to be understood that all matter herein set forth or shown in the accompanying drawings is to be interpreted as illustrative and not in a limiting sense.

The methods of the appended claims are not limited in scope by the specific methods described herein, which are intended as illustrations of a few aspects of the claims and any methods that are functionally equivalent are intended to fall within the scope of the claims. Various modifications of the methods in addition to those shown and described herein are intended to fall within the scope of the appended claims. Further, while only certain representative method steps disclosed herein are specifically described, other combinations of the method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated.

REFERENCES

1. Quadrelli R. and Peterson S. *Energy policy,* 2007, 35, 5938-5952.
2. (a) Tu W et al. *Adv. Mater.,* 2014, 26, 4607-4626; (b) Wang C et al. *J. Phys. Chem. Lett.,* 2010, 1, 48-53; (c) Woolerton T W et al. *J. Am. Chem. Soc.,* 2010, 132, 2132-2133; (d) Li P et al. *J. Am. Chem. Soc.,* 2015, 137, 9547-9550; (e) Asahi R et al. *Science,* 2001, 293, 269-271.
3. Habisreutinger S N et al. *Angew. Chem. Int. Ed.,* 2013, 52, 7372-7408.
4. Schultz D M and Yoon T P. *Science,* 2014, 343, 1239176.
5. Furukawa H et al. *Science,* 2013, 341, 1230444.
6. Yaghi O M et al. *Nature,* 2003, 423, 705-714.
7. Furukawa H et al. *Science,* 2010, 329, 424-428.
8. Murray L J et al. *Chem. Soc. Rev.,* 2009, 38, 1294-1314.
9. (a) Sumida K et al. *Chem. Rev.,* 2012, 112, 724-781; (b) Li J R et al. *Chem. Soc. Rev.,* 2009, 38, 1477-1504.
10. (a) Zeng L et al. *ACS Catal.,* 2016, 6, 7935-7947; (b) He H et al. *Small,* 2016, 12, 6309-6324.
11. Sun C Y et al. *Expert Opin. Drug Deliv.* 2013, 10, 89-101.
12. Kreno L E et al. *Chem. Rev.,* 2012, 112, 1105-1125.
13. (a) Yaghi O M. *J. Am. Chem. Soc.,* 2016, 138, 15507-15509; (b) Wang C et al. *J. Am. Chem. Soc,* 2013, 135, 13222-13234.
14. (a) Dan-Hardi M et al. *J. Am. Chem. Soc.,* 2009, 131, 10857-10859; (b) Yuan S et al. *Chem. Sci.,* 2015, 6, 3926-3930; (c) Bueken B et al. *Angew. Chem. Int. Ed.,* 2015, 54, 13912-13917; (d) Zou L et al. *Chem. Sci.,* 2016, 7, 1063-1069; (e) Assi H et al. *Inorg. Chem.,* 2016, 55, 7192-7199; (f) Nguyen H L et al. *J. Am. Chem. Soc.,* 2016, 138, 4330-4333; (g) Serre C et al. *Chem. Mater.,* 2006, 18, 1451; (h) Gao J et al. *Chem. Commun.,* 2014, 50, 3786-3788.
15. (a) Logan M W et al. *Catal. Sci. Technol.,* 2016, 6, 5647-5655; (b) Nasalevich M A et al. *Chem. Commun.,* 2013, 49, 10575-10577; (c) Sun D et al. *Appl. Catal., B,* 2015, 164, 428-432.
16. (a) Toyao T et al. *Catal. Sci. Technol.,* 2013, 3, 2092-2097; (b) Shen L et al. *Inorg. Chem.,* 2015, 54, 1191-1193; (c) Wang H et al. *J. Hazard. Mater.,* 2015, 286, 187-194.
17. Fu Y et al. *Angew. Chem. Int. Ed.,* 2012, 51, 3364-3367.
18. de Miguel M et al. *ChemPhysChem,* 2012, 13, 3651-3654.
19. (a) Hendon C H et al. *J. Am. Chem. Soc.,* 2013, 135, 10942-10945; (b) Lin C K et al. *Inorg. Chem.,* 2012, 51, 9039-9044; (c) Sippel P et al. *Adv. Funct. Mater.,* 2014, 24, 3885-3896; (d) Pham H Q et al. *J. Phys. Chem. C,* 2014, 118, 4567-4577.
20. Anslyn E V and Dougherty D A. *Modern Physical Organic Chemistry*, University Science Books, 2006.
21. Materials Studio, version 8.0; BIOVIA Software Inc.: San Diego Calif., 2014.
22. Toby B H and Von Dreele R B. *J. Appl. Crystallog.,* 2013, 46, 544-549.
23. Walton K S and Snurr R Q. *J. Am. Chem. Soc.,* 2007, 129, 8552-8556.
24. Hatchard C and Parker C A. *Proceedings of the Royal Society of London. Series A, Mathematical and Physical Sciences,* 1956, 235, 518-536.
25. Serpone N and Salinaro A. *Pure Appl. Chem.,* 1999, 71, 303-320.
26. Hahm H et al. *CrystEngComm,* 2015, 17, 5644-5650.
27. Santaclara J G et al. *ChemSusChem,* 2016, 9, 388-395.
28. Pimputkar S et al. *Nature Photonics,* 2009, 3, 180-182.
29. (a) Tills A et al. *Green Chem.,* 2015, 17, 157-168; (b) Hishida H et al. *Chem. Lett.,* 1987, 597-600; (c) Kobayashi K et al. *Angew. Chem. Int. Ed.,* 2014, 53, 11813-11817; (d) Zhang L et al. *Angew. Chem. Int. Ed.,* 2015, 54, 6186-6189; (e) Pellegrin Y and Odobel F. *Comptes Rendus Chimie,* 2016, DOI: 10.1016/j.crci.2015.11.026; (f) Patil U B et al. *Chem. Lett.* 2013, 42, 524526.

What is claimed is:

1. A metal-organic framework comprising titanium oxide clusters connected through an organic linker, wherein the organic linker comprises:

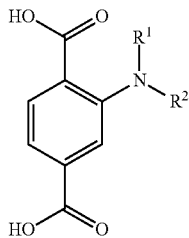

wherein $R^1$ is H and $R^2$ is cyclopentyl or cyclohexyl; and wherein the titanium oxide clusters comprise $Ti_8O_{12}$ ring shaped clusters.

2. The metal-organic framework of claim 1, wherein the metal-organic framework has a crystal structure in the high symmetry tetragonal I4/mmm space group with low residuals.

3. The metal-organic framework of claim 1, wherein the metal-organic framework has a BET surface area of from 100 m²/g to 2000 m²/g.

4. The metal-organic framework of claim 1, wherein the metal-organic framework has a BET surface area of from 200 m²/g to 1000 m²/g.

5. The metal-organic framework of claim 1, wherein the metal-organic framework has a total pore volume of from 0.05 cm³/g to 1.5 cm³/g.

6. The metal-organic framework of claim 1, wherein the metal-organic framework has a total pore volume of from 0.09 cm³/g to 0.73 cm³/g.

7. The metal-organic framework of claim 1, wherein the metal-organic framework has an adsorption capacity for $CO_2$ gas of from 5 to 500 cm³ of $CO_2$ gas per g of metal-organic framework.

8. The metal-organic framework of claim 1, wherein the metal-organic framework has an adsorption capacity for $CO_2$ gas of from 19 to 225 cm³ of $CO_2$ gas per g of metal-organic framework.

9. The metal-organic framework of claim 1, wherein the metal-organic framework has a bandgap of from 2.15 eV to 2.9 eV.

10. The metal-organic framework of claim 1, wherein the metal-organic framework has a bandgap of from 2.29 eV to 2.56 eV.

* * * * *